US008894481B2

(12) United States Patent
Saunders et al.

(10) Patent No.: US 8,894,481 B2
(45) Date of Patent: Nov. 25, 2014

(54) GAMING SYSTEM AND METHOD PROVIDING MULTIWAY EVALUATION FOR A GAME ASSOCIATED WITH MULTI-COMPONENT SYMBOLS CONFIGURED TO AFFECT A BASE COUNT

(75) Inventors: Brian F. Saunders, Sunnyvale, CA (US); Ernest M. Lafky, San Francisco, CA (US)

(73) Assignee: IGT, Las Vegas, NV (US)

( * ) Notice: Subject to any disclaimer, the term of this patent is extended or adjusted under 35 U.S.C. 154(b) by 292 days.

(21) Appl. No.: 13/596,921

(22) Filed: Aug. 28, 2012

(65) Prior Publication Data

US 2014/0066167 A1 Mar. 6, 2014

(51) Int. Cl.
*A63F 9/24* (2006.01)
*A63F 13/00* (2014.01)

(52) U.S. Cl.
USPC .............................................. 463/20; 463/16

(58) Field of Classification Search
CPC . G07F 17/32; G07F 17/3211; G07F 17/3213; G07F 17/3244; G07F 17/3255
See application file for complete search history.

(56) References Cited

U.S. PATENT DOCUMENTS 4,198,052 A 4/1980 Gauselmann
4,448,419 A 5/1984 Telnaes
4,695,053 A 9/1987 Vazquez et al.
4,836,546 A 6/1989 Dire et al.
4,838,552 A 6/1989 Hagiwara
4,874,173 A 10/1989 Kishishita
5,085,436 A 2/1992 Bennett
5,102,134 A 4/1992 Smyth
5,102,137 A 4/1992 Ekiert
5,205,555 A 4/1993 Hamano
5,224,706 A 7/1993 Bridgeman et al.
5,332,219 A 7/1994 Marnell et al.
5,332,228 A 7/1994 Schultz
5,342,047 A 8/1994 Heidel
5,393,057 A 2/1995 Marnell et al.
5,393,061 A 2/1995 Manship et al.
5,395,111 A 3/1995 Inoue
5,449,173 A 9/1995 Thomas et al.
5,569,084 A 10/1996 Nicastro et al.
5,580,053 A 12/1996 Crouch (Continued)

FOREIGN PATENT DOCUMENTS

AU 1987074936 6/1987
AU 199717601 A 9/1997

(Continued)

*Primary Examiner* — Lawrence Galka
(74) *Attorney, Agent, or Firm* — Neal, Gerber & Eisenberg LLP

(57) ABSTRACT

Various embodiments of the present disclosure are directed to a gaming system and method providing multiway evaluation for a game including multi-component symbols that are utilized to determine one or more modifiers. In one embodiment, the gaming system is configured to operate a game associated with a plurality of reels including a plurality of individual symbols and a plurality of multi-component symbols including a plurality of the individual symbols. The gaming system displays a plurality of the symbols on the reels and determines a quantity of adjacent reels that each displays at least one instance of a first individual symbol. The gaming system determines a modifier for each of the adjacent reels based on a quantity of instances of the first individual symbol displayed by that reel, and determines any awards for the first individual symbol based on the determined quantity of adjacent reels and any determined modifiers.

35 Claims, 16 Drawing Sheets

(56) References Cited

U.S. PATENT DOCUMENTS

| | | | | |
|---|---|---|---|---|
| 5,584,764 | A | 12/1996 | Inoue | |
| 5,609,524 | A | 3/1997 | Inoue | |
| 5,611,535 | A | 3/1997 | Tiberio | |
| 5,697,843 | A | 12/1997 | Manship et al. | |
| 5,704,835 | A | 1/1998 | Dietz | |
| 5,722,891 | A | 3/1998 | Inoue | |
| 5,743,526 | A | 4/1998 | Inoue | |
| 5,752,881 | A | 5/1998 | Inoue | |
| 5,766,074 | A | 6/1998 | Cannon et al. | |
| 5,769,716 | A | 6/1998 | Saffari et al. | |
| 5,807,172 | A | 9/1998 | Piechowiak | |
| 5,833,537 | A | 11/1998 | Barrie | |
| 5,848,932 | A | 12/1998 | Adams | |
| 5,882,261 | A | 3/1999 | Adams | |
| 5,890,962 | A | 4/1999 | Takemoto | |
| 5,976,016 | A | 11/1999 | Moody et al. | |
| 5,980,384 | A | 11/1999 | Barrie | |
| 5,984,781 | A | 11/1999 | Sunaga | |
| 5,984,782 | A | 11/1999 | Inoue | |
| 5,997,401 | A | 12/1999 | Crawford | |
| 6,004,207 | A | 12/1999 | Wilson et al. | |
| 6,027,115 | A | 2/2000 | Griswold et al. | |
| 6,033,307 | A | 3/2000 | Vancura | |
| 6,056,642 | A | 5/2000 | Bennett | |
| 6,059,289 | A | 5/2000 | Vancura | |
| 6,089,978 | A | 7/2000 | Adams | |
| 6,093,102 | A | 7/2000 | Bennett | |
| 6,095,921 | A | 8/2000 | Walker et al. | |
| 6,120,031 | A | 9/2000 | Adams | |
| 6,120,378 | A | 9/2000 | Moody et al. | |
| 6,159,096 | A | 12/2000 | Yoseloff | |
| 6,165,070 | A | 12/2000 | Nolte et al. | |
| 6,190,254 | B1 | 2/2001 | Bennett | |
| 6,220,959 | B1 | 4/2001 | Holmes, Jr. et al. | |
| 6,234,897 | B1 | 5/2001 | Frohm et al. | |
| 6,241,607 | B1 | 6/2001 | Payne et al. | |
| 6,261,177 | B1 | 7/2001 | Bennett | |
| 6,270,411 | B1 | 8/2001 | Gura et al. | |
| 6,290,600 | B1 | 9/2001 | Glasson | |
| 6,311,976 | B1 | 11/2001 | Yoseloff et al. | |
| 6,312,334 | B1 | 11/2001 | Yoseloff | |
| 6,315,660 | B1 | 11/2001 | DeMar et al. | |
| 6,322,078 | B1 | 11/2001 | Adams | |
| 6,328,649 | B1 | 12/2001 | Randall et al. | |
| 6,334,814 | B1 | 1/2002 | Adams | |
| 6,346,043 | B1 | 2/2002 | Colin et al. | |
| 6,358,147 | B1 | 3/2002 | Jaffe et al. | |
| 6,364,766 | B1 | 4/2002 | Anderson et al. | |
| 6,375,570 | B1 | 4/2002 | Poole | |
| 6,409,602 | B1 | 6/2002 | Wiltshire et al. | |
| 6,413,162 | B1 | 7/2002 | Baerlocher et al. | |
| 6,428,412 | B1 | 8/2002 | Anderson et al. | |
| 6,439,993 | B1 | 8/2002 | O'Halloran | |
| 6,464,582 | B1 | 10/2002 | Baerlocher et al. | |
| 6,494,454 | B2 | 12/2002 | Adams | |
| 6,517,433 | B2 | 2/2003 | Loose et al. | |
| 6,547,663 | B1 * | 4/2003 | Delott et al. | 463/25 |
| 6,551,187 | B1 | 4/2003 | Jaffe | |
| 6,554,703 | B1 | 4/2003 | Bussick et al. | |
| 6,554,704 | B2 | 4/2003 | Nicastro et al. | |
| 6,561,900 | B1 | 5/2003 | Baerlocher et al. | |
| 6,561,904 | B2 | 5/2003 | Locke et al. | |
| 6,565,433 | B1 | 5/2003 | Baerlocher et al. | |
| 6,569,015 | B1 | 5/2003 | Baerlocher et al. | |
| 6,616,142 | B2 | 9/2003 | Adams | |
| 6,632,139 | B1 | 10/2003 | Baerlocher | |
| 6,634,945 | B2 | 10/2003 | Glavich et al. | |
| 6,638,164 | B2 | 10/2003 | Randall et al. | |
| 6,669,559 | B1 | 12/2003 | Baerlocher et al. | |
| 6,672,960 | B1 | 1/2004 | B-Jensen | |
| 6,692,355 | B2 | 2/2004 | Baerlocher et al. | |
| 6,702,675 | B2 | 3/2004 | Poole et al. | |
| 6,719,630 | B1 | 4/2004 | Seelig et al. | |
| 6,726,563 | B1 | 4/2004 | Baerlocher et al. | |
| 6,731,313 | B1 | 5/2004 | Kaminkow | |
| 6,746,328 | B2 | 6/2004 | Cannon et al. | |
| 6,749,502 | B2 | 6/2004 | Baerlocher | |
| 6,780,109 | B2 | 8/2004 | Kaminkow | |
| 6,786,818 | B1 | 9/2004 | Rothschild et al. | |
| 6,793,577 | B1 | 9/2004 | Wilkins et al. | |
| 6,805,349 | B2 | 10/2004 | Baerlocher et al. | |
| 6,805,632 | B2 | 10/2004 | Suda | |
| 6,808,454 | B2 | 10/2004 | Gerrard et al. | |
| 6,840,858 | B2 | 1/2005 | Adams | |
| 6,855,053 | B2 | 2/2005 | Baerlocher | |
| 6,855,054 | B2 | 2/2005 | White et al. | |
| 6,857,958 | B2 * | 2/2005 | Osawa | 463/20 |
| 6,866,583 | B2 | 3/2005 | Glavich et al. | |
| 6,878,061 | B2 | 4/2005 | Baerlocher et al. | |
| 6,896,617 | B2 | 5/2005 | Daly | |
| 6,905,405 | B2 | 6/2005 | McClintic | |
| 6,905,406 | B2 | 6/2005 | Kaminkow et al. | |
| 6,918,832 | B2 | 7/2005 | Baerlocher et al. | |
| 6,921,335 | B2 | 7/2005 | Rodgers et al. | |
| 6,929,952 | B2 | 8/2005 | Baerlocher | |
| 6,939,223 | B1 | 9/2005 | Jones | |
| 6,939,229 | B2 | 9/2005 | McClintic | |
| 6,960,133 | B1 | 11/2005 | Marks et al. | |
| 6,964,416 | B2 | 11/2005 | McClintic et al. | |
| 6,971,954 | B2 | 12/2005 | Randall | |
| 6,981,635 | B1 | 1/2006 | Hughs-Baird et al. | |
| 6,988,947 | B2 | 1/2006 | Baerlocher et al. | |
| 6,997,808 | B2 | 2/2006 | Rodgers et al. | |
| 7,001,274 | B2 | 2/2006 | Baerlocher et al. | |
| 7,007,953 | B1 | 3/2006 | Cabot | |
| 7,014,560 | B2 | 3/2006 | Glavich et al. | |
| 7,040,983 | B2 | 5/2006 | Dolloff et al. | |
| 7,056,209 | B2 | 6/2006 | Baerlocher et al. | |
| 7,056,213 | B2 | 6/2006 | Ching et al. | |
| 7,059,967 | B2 | 6/2006 | Baerlocher | |
| 7,070,502 | B1 | 7/2006 | Bussick et al. | |
| 7,074,127 | B2 | 7/2006 | Cuddy et al. | |
| 7,090,580 | B2 | 8/2006 | Rodgers et al. | |
| 7,094,148 | B2 | 8/2006 | Baerlocher et al. | |
| 7,128,646 | B2 | 10/2006 | Baerlocher et al. | |
| 7,137,888 | B2 | 11/2006 | Glavich et al. | |
| 7,169,042 | B2 | 1/2007 | Muir et al. | |
| 7,229,350 | B2 | 6/2007 | Baerlocher et al. | |
| 7,258,611 | B2 | 8/2007 | Bigelow, Jr. et al. | |
| 7,281,977 | B2 | 10/2007 | Jones | |
| 7,294,055 | B2 | 11/2007 | Baerlocher et al. | |
| 7,331,862 | B2 | 2/2008 | Rodgers et al. | |
| 7,341,512 | B2 | 3/2008 | Dolloff et al. | |
| 7,371,168 | B2 | 5/2008 | Bilyeu et al. | |
| 7,371,170 | B2 | 5/2008 | Cregan et al. | |
| 7,381,134 | B2 | 6/2008 | Cuddy et al. | |
| 7,387,570 | B2 | 6/2008 | Randall | |
| 7,399,226 | B2 | 7/2008 | Mishra | |
| 7,402,102 | B2 | 7/2008 | Marks et al. | |
| 7,448,948 | B2 | 11/2008 | Hughs-Baird et al. | |
| 7,494,412 | B2 | 2/2009 | Baerlocher | |
| 7,526,736 | B2 | 4/2009 | Kaminkow et al. | |
| 7,578,737 | B2 | 8/2009 | Cregan et al. | |
| 7,578,738 | B2 | 8/2009 | Cregan et al. | |
| 7,674,173 | B2 | 3/2010 | Bennett | |
| 7,850,521 | B2 | 12/2010 | Rodgers et al. | |
| 7,922,573 | B2 | 4/2011 | Baerlocher et al. | |
| 8,002,625 | B2 | 8/2011 | Maya | |
| 8,012,011 | B2 | 9/2011 | Baerlocher et al. | |
| 2002/0039920 | A1 | 4/2002 | Bryant | |
| 2002/0052233 | A1 | 5/2002 | Gauselmann | |
| 2002/0058545 | A1 | 5/2002 | Luciano | |
| 2002/0094857 | A1 | 7/2002 | Meyer | |
| 2003/0045345 | A1 | 3/2003 | Berman | |
| 2003/0045354 | A1 | 3/2003 | Giobbi | |
| 2003/0060267 | A1 | 3/2003 | Glavich et al. | |
| 2003/0064768 | A1 | 4/2003 | Fier | |
| 2003/0125105 | A1 | 7/2003 | Bennett | |
| 2003/0162585 | A1 | 8/2003 | Bigelow, Jr. et al. | |
| 2003/0190945 | A1 | 10/2003 | Bussick et al. | |
| 2003/0203753 | A1 | 10/2003 | Muir et al. | |
| 2003/0216165 | A1 | 11/2003 | Singer et al. | |
| 2004/0009803 | A1 * | 1/2004 | Bennett et al. | 463/16 |
| 2004/0023714 | A1 | 2/2004 | Asdale | |

(56) References Cited

U.S. PATENT DOCUMENTS

| | | | | |
|---|---|---|---|---|
| 2004/0048650 | A1 | 3/2004 | Mierau et al. | |
| 2004/0048651 | A1 | 3/2004 | Vorias et al. | |
| 2004/0053677 | A1 | 3/2004 | Hughs-Baird | |
| 2004/0058727 | A1 | 3/2004 | Marks et al. | |
| 2004/0067790 | A1 | 4/2004 | Peterson et al. | |
| 2004/0077396 | A1 | 4/2004 | Poole et al. | |
| 2004/0121838 | A1 | 6/2004 | Hughs-Baird et al. | |
| 2004/0171416 | A1 | 9/2004 | Baerlocher et al. | |
| 2004/0171420 | A1 | 9/2004 | Baerlocher et al. | |
| 2004/0185928 | A1 | 9/2004 | Baerlocher et al. | |
| 2004/0192431 | A1 | 9/2004 | Singer et al. | |
| 2004/0195773 | A1 | 10/2004 | Masci et al. | |
| 2004/0242313 | A1 | 12/2004 | Munoz | |
| 2004/0242316 | A1 | 12/2004 | Oles et al. | |
| 2004/0248641 | A1 | 12/2004 | Jarvis | |
| 2004/0259628 | A1 | 12/2004 | Randall | |
| 2005/0020344 | A1 | 1/2005 | Kaminkow | |
| 2005/0037836 | A1* | 2/2005 | Gilmore et al. | 463/25 |
| 2005/0043081 | A1 | 2/2005 | Baerlocher | |
| 2005/0049035 | A1 | 3/2005 | Baerlocher et al. | |
| 2005/0054418 | A1 | 3/2005 | Baerlocher | |
| 2005/0054420 | A1 | 3/2005 | Cregan et al. | |
| 2005/0054436 | A1 | 3/2005 | Frizzell et al. | |
| 2005/0059477 | A1 | 3/2005 | Baerlocher | |
| 2005/0059478 | A1 | 3/2005 | Peterson et al. | |
| 2005/0064924 | A1 | 3/2005 | Glavich et al. | |
| 2005/0071023 | A1 | 3/2005 | Gilliland et al. | |
| 2005/0096121 | A1 | 5/2005 | Gilliland et al. | |
| 2005/0148384 | A1 | 7/2005 | Marks et al. | |
| 2005/0170876 | A1 | 8/2005 | Masci et al. | |
| 2005/0192081 | A1 | 9/2005 | Marks et al. | |
| 2005/0227754 | A1 | 10/2005 | Kaminkow et al. | |
| 2006/0019738 | A1* | 1/2006 | Baerlocher et al. | 463/20 |
| 2006/0030392 | A1 | 2/2006 | Rodgers et al. | |
| 2006/0063584 | A1 | 3/2006 | Brill et al. | |
| 2006/0068875 | A1 | 3/2006 | Cregan et al. | |
| 2006/0068883 | A1 | 3/2006 | Randall et al. | |
| 2006/0073876 | A1 | 4/2006 | Cuddy | |
| 2006/0073879 | A1* | 4/2006 | Baerlocher | 463/20 |
| 2006/0084492 | A1* | 4/2006 | Baerlocher et al. | 463/20 |
| 2006/0084493 | A1 | 4/2006 | Pederson et al. | |
| 2006/0084494 | A1 | 4/2006 | Belger et al. | |
| 2006/0084498 | A1* | 4/2006 | Baerlocher et al. | 463/20 |
| 2006/0089191 | A1 | 4/2006 | Singer et al. | |
| 2006/0121974 | A1 | 6/2006 | Rodgers et al. | |
| 2006/0172795 | A1 | 8/2006 | Bussick et al. | |
| 2006/0189364 | A1 | 8/2006 | Baerlocher | |
| 2006/0199636 | A1 | 9/2006 | Ching et al. | |
| 2006/0199637 | A1 | 9/2006 | Ching et al. | |
| 2006/0205465 | A1 | 9/2006 | Dolloff et al. | |
| 2007/0004489 | A1 | 1/2007 | Rodgers et al. | |
| 2007/0010316 | A1 | 1/2007 | Baerlocher et al. | |
| 2007/0021176 | A1 | 1/2007 | Jackson | |
| 2007/0060248 | A1 | 3/2007 | Rodgers et al. | |
| 2007/0060255 | A1 | 3/2007 | Baerlocher et al. | |
| 2007/0060274 | A1 | 3/2007 | Rowe et al. | |
| 2007/0281778 | A1 | 12/2007 | Bigelow et al. | |
| 2008/0032783 | A1 | 2/2008 | Walker et al. | |
| 2008/0045323 | A1* | 2/2008 | Berman | 463/20 |
| 2008/0085759 | A1 | 4/2008 | Bilyeu et al. | |
| 2008/0108408 | A1 | 5/2008 | Wolf | |
| 2008/0113735 | A1 | 5/2008 | Maya | |
| 2008/0132320 | A1 | 6/2008 | Rodgers | |
| 2008/0139298 | A1 | 6/2008 | Rodgers et al. | |
| 2008/0182650 | A1 | 7/2008 | Randall et al. | |
| 2008/0194313 | A1* | 8/2008 | Walker | 463/20 |
| 2008/0200237 | A1 | 8/2008 | Cuddy et al. | |
| 2008/0200238 | A1 | 8/2008 | Mishra | |
| 2008/0280673 | A1* | 11/2008 | Marks et al. | 463/20 |
| 2009/0111559 | A1 | 4/2009 | Souza et al. | |
| 2009/0118004 | A1 | 5/2009 | Hoffman | |
| 2009/0124347 | A1 | 5/2009 | Rodgers et al. | |
| 2010/0029364 | A1 | 2/2010 | Zielinski | |
| 2010/0120496 | A1 | 5/2010 | Hoffman et al. | |
| 2010/0120501 | A1 | 5/2010 | Hoffman et al. | |
| 2010/0120507 | A1 | 5/2010 | Rodgers et al. | |
| 2011/0086695 | A1 | 4/2011 | Evans | |
| 2011/0098098 | A1* | 4/2011 | Stewart et al. | 463/20 |

FOREIGN PATENT DOCUMENTS

| | | | |
|---|---|---|---|
| EP | 0410789 | A2 | 1/1991 |
| GB | 2106292 | A | 4/1983 |
| GB | 2316214 | | 2/1998 |
| WO | WO 97/32285 | A1 | 9/1997 |
| WO | WO 2005/009560 | A2 | 2/2005 |
| WO | WO 2007/084766 | | 7/2007 |

* cited by examiner

GAMING SYSTEM AND METHOD PROVIDING MULTIWAY EVALUATION FOR A GAME ASSOCIATED WITH MULTI-COMPONENT SYMBOLS CONFIGURED TO AFFECT A BASE COUNT

CROSS-REFERENCE TO RELATED APPLICATIONS

This application is related to the following commonly owned patent applications: U.S. patent application Ser. No. 13/596,932 entitled "GAMING SYSTEM AND METHOD PROVIDING MULTIWAY EVALUATION FOR A GAME ASSOCIATED WITH MULTI-COMPONENT SYMBOLS CONFIGURED TO AFFECT A VALUE OF ONE OR MORE MODIFIERS;" and U.S. patent application Ser. No. 13/596,899 entitled "GAMING SYSTEM AND METHOD PROVIDING MULTIWAY EVALUATION FOR A GAME ASSOCIATED WITH MULTI-COMPONENT SYMBOLS CONFIGURED TO AFFECT A BASE COUNT AND/OR A VALUE OF ONE OR MORE MODIFIERS,."

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Electronic gaming machine (EGM) manufacturers strive to make EGMs that provide as much enjoyment, entertainment, and excitement as possible for players. Providing interesting and exciting primary or base games and secondary or bonus games in which a player has an opportunity to win potentially large awards (such as credits) is one way to enhance player enjoyment and excitement. Certain known EGMs use mechanical devices such as reels, wheels, or spheres to enhance the attraction of the gaming machines to players and also to enhance the player's game playing experience. These mechanical devices enable a player to see physical movements of a game, a portion of a game, or a functional game event or element, which increases the players enjoyment of the game.

in one known slot EGM, the EGM includes a plurality of reels and one or more paylines. Such EGMs include any suitable number of reels, such as three to five reels, which each display any suitable number of symbols per reel, such as three symbols per reel. In these EGMs, the player initiates the spinning of the reels by making one or more wagers on one or more paylines. Such EGMs may have one, three, five, nine, fifteen, twenty-five, or any other suitable number of paylines that are horizontal, vertical, diagonal, or any combination thereof. One type of EGM includes a payline associated with each possible combination of symbol positions, wherein each payline passes through only one symbol position on each reel. The player wagers on a player selected number or combination of paylines, such as one, two, three, five, ten, or fifteen paylines, and the reels are activated to spin.

The reels spin and generate a plurality of symbols, and the EGM analyzes the generated symbols to determine if the EGM has randomly generated a winning symbol or winning symbol combination on or along one or more of the wagered-on paylines. Any awards associated with any winning symbols or winning symbol combinations generated along any wagered-on paylines are provided to the player.

In these EGMs, the awards provided to the player are generally based on the number of paylines that pass through each of the winning symbol combinations. That is, the EGM separately analyzes each wagered-on payline to determine if a winning symbol combination is generated on that payline. For each occurrence of each payline passing through a winning symbol combination, the EGM provides the player the award associated with that winning symbol combination. For example, in a five reel EGM, if four related symbols (that form a winning symbol combination) are generated by the first four reels and twelve paylines pass through the first three of those related symbols (i.e., three paylines running left to right pass through all four related symbols and nine paylines running left to right pass through the first three related symbols), the EGM provides the player twelve awards (i.e., one award for each payline that passes through the winning symbol combination). These twelve separate awards are each for the single occurrence of the winning symbol combination including the four related symbols. Accordingly, in a EGM with wagering on paylines, the greater the number of wagered-on paylines that pass through a winning symbol combination, the greater the award as compared to an identical winning symbol combination in which fewer wagered-on paylines pass through the same winning symbol combination.

In another type of EGM with reels, the player wagers on a number of ways to win, wherein any award provided to the player is based on the number of associated symbols that are generated in active symbol positions on a requisite number of adjacent reels. In such ways to win EGMs, the EGM determines any outcome to provide to the player based on the number of associated symbols which are generated in active symbol positions on a requisite number of adjacent reels (i.e., not on paylines passing through any displayed winning symbol combinations).

In some known ways to win EGMs, the total number of ways to win is determined by multiplying the number of symbols generated in active symbol positions on a first reel by the number of symbols generated in active symbol positions on a second reel by the number of symbols generated in active symbol positions on a third reel and so on for each reel of the EGM with at least one symbol generated in an active symbol position. For example, a three reel EGM with three symbols generated in active symbol positions on each reel includes 27 ways to win (i.e., 3 symbols on the first reel×3 symbols on the second reel×3 symbols on the third reel). A four reel EGM with three symbols generated In active symbol positions on each reel includes 81 ways to win (i.e., 3 symbols on the first reel×3 symbols on the second reel×3 symbols on the third reel×3 symbols on the fourth reel). A five reel EGM with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). Modifying the number of generated symbols by either modifying the number of reels or modifying the number of symbols generated in active symbol positions by one or more of the reels modifies the number of ways to win.

There is a continuing need to provide new and exciting manners of evaluating symbols to determine awards to increase player enjoyment, entertainment, and excitement.

SUMMARY

Various embodiments of the present disclosure are directed to a gaming system and method providing multiway evaluation for a game in which one or more displayed multi-component symbols are utilized to determine one or more modifiers that are employed to determine one or more awards, in one such embodiment, the gaming system is configured to operate a game associated with a plurality of reels including a plurality of symbols. The symbols include a plurality of individual symbols and one or more multi-component symbols. Each of the multi-component symbols includes a plurality of instances of one or more of the individual symbols. In this embodiment, the game is also associated with a plurality of symbol display areas. Each of the reels is associated with a plurality of the symbol display areas. For a play of the game, for each of the reels, the gaming system displays a plurality of the symbols on that reel at the symbol display areas associated with that reel.

In this embodiment, the gaming system makes an award determination for each individual symbol displayed at one or more of the symbol display areas associated with a first one of the reels. More specifically, for a first individual symbol displayed at one or more of the symbol display areas associated with the first reel, the gaming system determines a quantity of adjacent reels that each displays at least one instance of the first individual symbol at one of the symbol display areas associated with that reel. The adjacent reels include the first reel.

If the determined quantity of adjacent reels is at least a designated quantity, the gaming system determines, for each of the adjacent reels, a modifier for that reel based on a quantity of instances of the first individual symbol that are displayed at the symbol display areas associated with that reel. The gaming system determines any awards for the first individual symbol based at least in part on the determined quantity of adjacent reels and any determined modifiers. The gaming system repeats this award determination process for each additional individual symbol displayed at one or more of the symbol display areas associated with the first reel (if any), and provides any determined awards.

Further embodiments of the present disclosure are directed to a gaming system and method providing multiway evaluation for a game in which one or more displayed multi-component symbols are utilized to determine a base count that is employed to determine one or more awards. In one such embodiment, the gaming system makes an award determination for each individual symbol displayed at one or more of the symbol display areas associated with a first one of the reels. More specifically, for a first individual symbol displayed at one or more of the symbol display areas associated with the first reel, if the reel adjacent to the first reel displays at least one instance of the first individual symbol at one of the symbol display areas associated with that reel, the gaming system determines a quantity of adjacent reels that each displays at least one instance of the first individual symbol at one of the symbol display areas associated with that reel. The gaming system determines a base count based on: (a) a total quantity of instances of the first individual symbol included in any multi-component symbols including a plurality of instances of the first individual symbol displayed at the symbol display areas associated with the adjacent reels; and (b) a quantity of the adjacent reels that do not display any multi-component symbols including a plurality of instances of the first individual symbol at the symbol display areas associated with those reels.

The gaming system determines whether the determined base count is at least the designated base count. If the determined base count is not at least the designated base count, the gaming system ends the award determination with respect to the first individual symbol, and repeats the award determination process for each additional individual symbol displayed at one or more of the symbol display areas associated with the first reel (if any). If the determined base count is at least the designated base count, the gaming system determines, for each of the adjacent reels, a modifier for that reel based on a quantity of the symbol display areas associated with that reel at which at least one instance of the first individual symbol is displayed. The gaming system determines any awards for that individual symbol based on the determined base count and any determined modifiers. The gaming system ends the award determination process with respect to the first individual symbol, and repeats the award determination process for each additional individual symbol displayed at one or more of the symbol display areas associated with the first reel (if any). The gaming system provides any determined awards.

Certain other embodiments of the present disclosure are directed to a gaming system and method providing multiway evaluation for a game in which one or more displayed multi-component symbols are utilized to: (a) determine one or more modifiers that are employed to determine one or more awards, (b) determine a base count that is employed to determine one or more awards, or (c) determine one or more modifiers that are employed to determine one or more awards and determine a base count that is employed to determine one or more awards. In one such embodiment, each multi-component symbol has or is associated with at least one of a first designation and a second designation.

In this embodiment, the gaming system makes an award determination associated with each individual symbol displayed at one or more of the symbol display areas associated with a first one of the reels. More specifically, for a first individual symbol displayed at one or more of the symbol display areas associated with the first reel, if the reel adjacent to the first reel displays at least one instance of the first individual symbol at one of the symbol display areas associated with that reel, the gaming system determines a quantity of adjacent reels that each displays at least one instance of the first individual symbol at one of the symbol display areas associated with that reel.

In this embodiment, the gaming system determines a base count based on: (a) a total quantity of instances of the first individual symbol included in any multi-component symbols having the first designation and including a plurality of instances of the first individual symbol displayed at the symbol display areas associated with the adjacent reels; and (b) a quantity of the adjacent reels that do not display any multi-component symbols having the first designation and including a plurality of instances of the first individual symbol at the symbol display areas associated with those reels.

The gaming system determines whether the determined base count is at least the designated base count. If the determined base count is not at least the designated base count, the gaming system ends the award determination with respect to the first individual symbol, and repeats the award determination process for each additional individual symbol displayed at one or more of the symbol display areas associated with the first reel (if any). If the determined base count is at least the designated base count, the gaming system determines, for each of the adjacent reels, a modifier for that reel based on: (a) a quantity of the symbol display areas associated with that reel at which at least one instance of the first individual symbol is displayed, and (b) any instances of any multi-component symbols having the second designation and including at least one instance of the first individual symbol displayed at the symbol display areas associated with that reel.

The gaming system determines any awards associated with that individual symbol based on the determined base count and any determined modifiers. The gaming system ends the award determination process with respect to the first individual symbol, and repeats the award determination process for each additional individual symbol displayed at one or more of the symbol display areas associated with the first reel (if any). The gaming system provides any determined awards.

Thus, in various embodiments, the gaming system of the present disclosure is configured to employ new manners of evaluating symbols to determine awards, thereby increasing player enjoyment, entertainment, and excitement.

Additional features and advantages are described herein, and will be apparent from, the following Detailed Description and the Figures.

DETAILED DESCRIPTION

Multiway Evaluation for a Game Associated with Multi-Component Symbols

Various embodiments of the present disclosure are directed to a gaming system and method providing multiway evaluation for a game in which one or more displayed multi-component symbols are utilized to, in certain instances, determine (at least in part) one or more modifiers that are employed to determine one or more awards. While the embodiments described below are directed to a primary wagering game, it should be appreciated that the present disclosure may additionally or alternatively be employed in association with a secondary or bonus game. Moreover, while the player's credit balance, the player's wager, and any awards are displayed as an amount of monetary credits or currency in the embodiments described below, one or more of such players credit balance, such players wager, and any awards provided to such player may be for non-monetary credits, promotional credits, and/or player tracking points or credits.

In the embodiments described below, all of the symbol display areas are considered active symbol display areas that the gaming system evaluates using the multiway award evaluation described herein. It should be appreciated that, in certain instances, fewer than all of the symbol display areas will be considered active for a play of a game, such as when a player does not wager on each of the symbol display areas, in such instances, the gaming system will consider the active symbol display areas and not the inactive symbol display areas when using the multiway award evaluation described herein.

Figure 1:
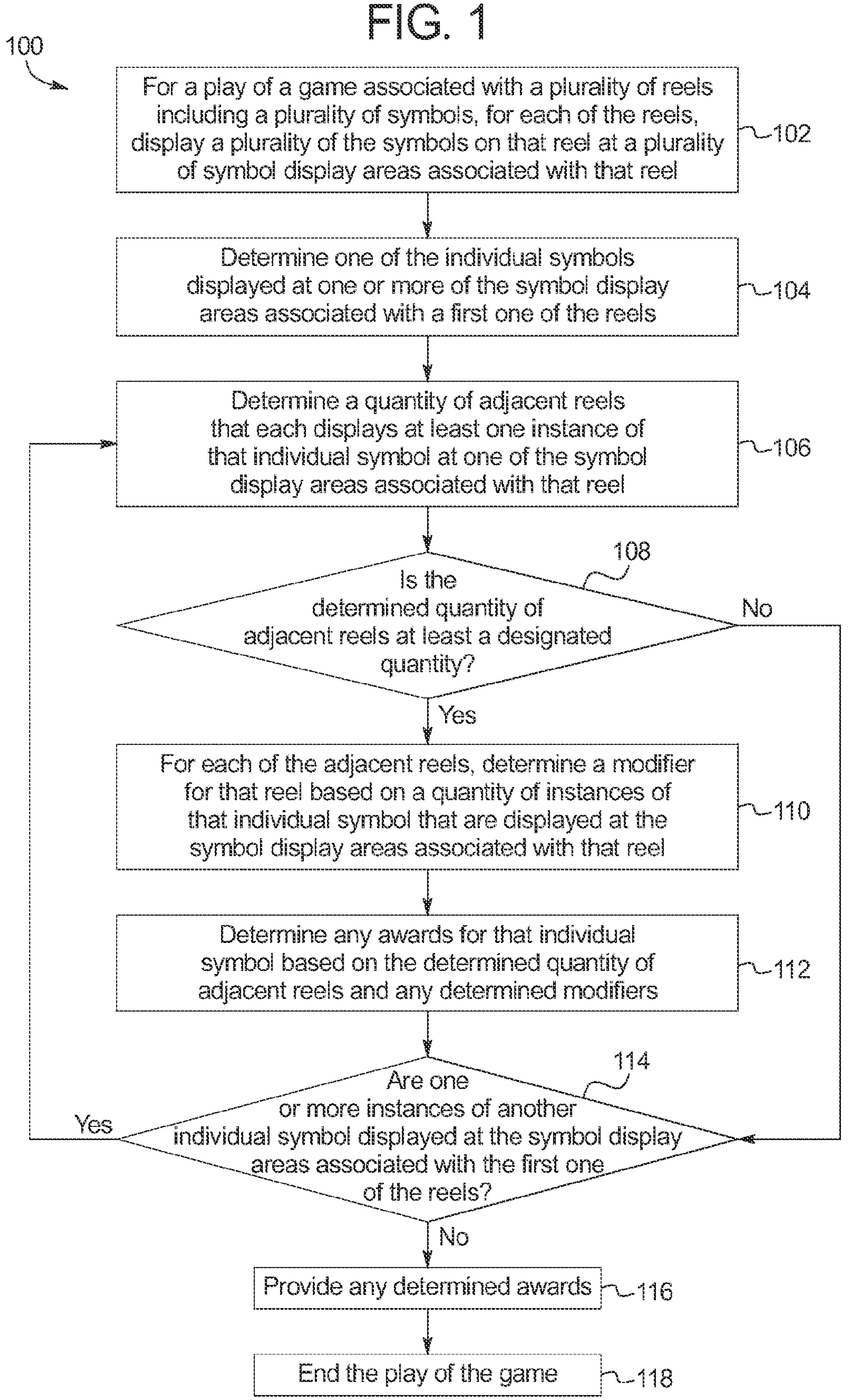
FIG. 1 is a flowchart illustrating a method of operating an example embodiment of the gaming system of the present disclosure configured to provide multiway evaluation for a game in which one or more displayed multi-component symbols are utilized to determine one or more modifiers that are employed to determine one or more awards.

FIG. 1 illustrates a flowchart of a process or method 100 for operating an example embodiment of the gaming system of the present disclosure. In various embodiments, process 100 is represented by a set of instructions stored in one or more memories and executed by one or more processors. Although process 100 is described with reference to the flowchart shown in FIG. 1, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In this example, the gaming system is configured to operate a game associated with a plurality of reels including a plurality of symbols. The symbols include a plurality of individual symbols and one or more multi-component symbols. Each of the multi-component symbols includes a plurality of instances of one or more of the individual symbols. The game is also associated with a plurality of symbol display areas. Each of the reels is associated with a plurality of the symbol display areas. For a play of the game, for each of the reels, the gaming system displays a plurality of the symbols on that reel at the symbol display areas associated with that reel, as indicated by block 102. The gaming system determines one of the individual symbols displayed at one or more of the symbol display areas associated with a first one of the reels, as indicated by block 104. The gaming system determines a quantity of adjacent reels that each displays at least one instance of that individual symbol at one of the symbol display areas associated with that reel, as indicated by block 106. The adjacent reels include the first reel.

The gaming system determines whether the determined quantity of adjacent reels is at least a designated quantity, as indicated by diamond 108. If the determined quantity of adjacent reels is not at least the designated quantity, process 100 proceeds to diamond 114, described below. If the determined quantity of adjacent reels is at least the designated quantity, for each of the adjacent reels, the gaming system determines a modifier for that reel based on a quantity of instances of that individual symbol that are displayed at the symbol display areas associated with that reel, as indicated by block 110. The gaming system determines any awards for that individual symbol based on the determined quantity of adjacent reels and any determined modifiers, as indicated by block 112.

The gaming system determines whether one or more instances of another individual symbol are displayed at the symbol display areas associated with the first one of the reels, as indicated by diamond 114. If one or more instances of another individual symbol are displayed at the symbol display areas associated with the first one of the reels, process 100 returns to block 106. If one or more instances of another individual symbol are not displayed at the symbol display areas associated with the first one of the reels, the gaming system provides any determined awards, as indicated by block 116, and ends the play of the game, as indicated by block 118.

Figure 2:
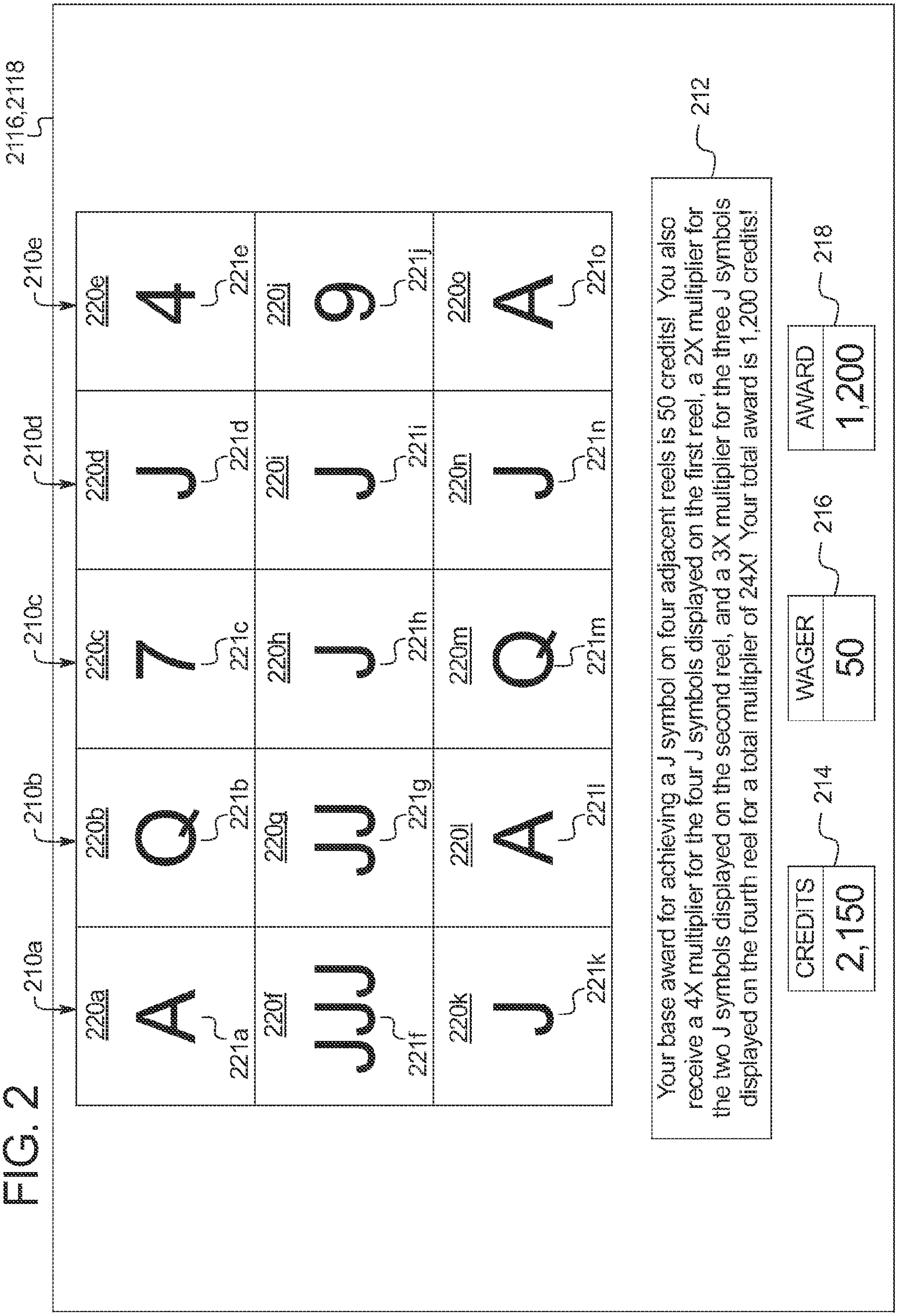
FIG. 2 illustrates a screen shot of an example embodiment of the gaming system of the present disclosure configured to provide multiway evaluation for a game in which one or more displayed multi-component symbols are utilized to determine one or more modifiers that are employed to determine one or more awards.

FIG. 2 illustrates a screen shot of an example embodiment of the gaming system of the present disclosure. In this example, the gaming system is configured to operate a primary slot-type wagering game associated with a plurality of reels 210*a*, 210*b*, 210*c*, 210*d*, and 210*e* including a plurality of symbols. It should be appreciated that any suitable quantity of reels and any suitable symbols may be employed. In this example, the symbols include a plurality of individual symbols and a plurality of multi-component symbols. Additionally, in this example, each of the multi-component symbols includes a plurality of instances of one or more of the individual symbols. That is, each of the multi-component symbols includes: (a) a plurality of instances of a same individual symbol (such as three instances of the individual A symbol or, in other words, AAA); (b) at least one instance of each of a plurality of different individual symbols (such as one instance of each of the individual A, K, and Q symbols or, in other words, AKQ); (c) at least one instance of one individual symbol and a plurality of instances of another different individual symbol (such as two instances of the individual A symbol and one instance of the individual K symbol or, in other words, AAK); or (d) a plurality of instances of each of a plurality of different individual symbols (such as two instances of each of the individual A and K symbols or, in other words, AAKK). It should be appreciated that a multi-component symbol may include any suitable combination of instances of the individual symbols.

The primary wagering game is associated with, and the gaming system displays (such as on display device 2116 or 2118 described below), a plurality of symbol display areas 220*a*, 220*b*, 220*c*, 220*d*, 220*e*, 220*f*, 220*g*, 220*h*, 220*i*, 220*j*, 220*k*, 220*l*, 220*m*, 220*n*, and 220*o* arranged in a 3×5 matrix. It should be appreciated that any suitable quantity of symbol display areas may be employed and arranged in any suitable manner. Each of the reels is associated with a plurality of the symbol display areas. Specifically, in this example: reel 210*a* is associated with symbol display areas 220*a*, 220*f*, and 220*k*; reel 210*b* is associated with symbol display areas 220*b*, 220*g*, and 220*l*; reel 210*c* is associated with symbol display areas 220*c*, 220*h*, and 220*m*; reel 210*d* is associated with symbol display areas 220*d*, 220*i*, and 220*n*; and reel 210*e* is associated with symbol display areas 220*e*, 220*j*, and 220*o*. For each of the reels, the symbols on that reel are displayable at the symbol display areas associated with that reel.

Additionally, in this example, the gaming system displays: a message display area 212, which displays information, notifications, and/or messages before, during, or after play of the primary wagering game; a credit meter 214, which displays a players credit balance in the form of an amount of credits; a wager indicator 216, which displays the player's wager for a play of the primary wagering game in the form of an amount of credits; and an award meter 218, which displays any awards provided to the player in the form of an amount of credits. While in this illustrated example the gaming system indicates the player's credit balance, the player's wager, and any awards provided to the player in the form of amounts of credits, it should be appreciated that such indications may alternatively or additionally be made in the form of amounts of currency.

As illustrated in FIG. 2, upon initiation of a play of the primary wagering game for the maximum wager of 50 credits in this example, the gaming system determined and displayed an outcome for the play of the primary wagering game by, for each of the reels, spinning that reel and displaying a plurality of the symbols on that reel at the symbol display areas associated with that reel. Specifically, the gaming system:

(a) spun reel 210*a* and displayed: an instance 221*a* of the individual A symbol at symbol display area 220*a*; an instance 221*f* of the multi-component JJJ symbol, which includes three instances of the individual J symbol, at symbol display area 220*f*; and an instance 221*k* of the individual J symbol at symbol display area 220*k*;

(b) spun reel 210*b* and displayed: an instance 221*b* of the individual Q symbol at symbol display area 220*b*; an instance 221*g* of the multi-component JJ symbol, which includes two instances of the individual J symbol, at symbol display area 220*g*; and an instance 221*l* of the individual A symbol at symbol display area 220*l*;

(c) spun reel 210*c* and displayed: an instance 221*c* of the individual 7 symbol symbol at symbol display area 220*c*, an instance 221*h* of the individual J symbol at symbol display area 220*h*, and an instance of the individual Q symbol at symbol display area 221*m*;

(d) spun reel 210*d* and displayed: an instance 221*d* of the individual J symbol at symbol display area 220*d*, an instance 221*i* of the individual J symbol at symbol display area 220*i*, and an instance 221*m* of the individual J symbol at symbol display area 220*m*; and (e) spun reel 210*e* and displayed: an instance 221*e* of the individual 4 symbol at symbol display area 220*e*; an instance 221*j* of the individual 9 symbol at symbol display area 220*j*, and an instance 221*o* of the individual A symbol at symbol display area 220*o*.

Generally, for a play of the primary wagering game in this example, the gaming system makes an award determination associated with each individual symbol displayed at one or more of the symbol display areas associated with a first one of the reels. More specifically, for a first individual symbol displayed at one or more of the symbol display areas associated with the first reel, the gaming system determines a quantity of adjacent reels that each displays at least one instance of the first individual symbol at one of the symbol display areas associated with that reel. The adjacent reels include the first reel. If the determined quantity of adjacent reels is at least a designated quantity, the gaming system determines, for each of the adjacent reels, a modifier for that reel based on a quantity of instances of the first individual symbol that are displayed at the symbol display areas associated with that reel. The gaming system determines any awards for the first individual symbol based at least in part on the determined quantity of adjacent reels and any determined modifiers. The gaming system repeats this award determination process for each additional individual symbol displayed at one or more of the symbol display areas associated with the first one of the reels (if any), and provides any determined awards.

In this example, the first reel is the leftmost reel and the designated quantity is three. Thus, in this example, the gaming system makes an award determination for each individual symbol displayed at one or more of the symbol display areas associated with the leftmost reel. More particularly, for a first individual symbol displayed at one or more of the symbol display areas associated with the leftmost reel, the gaming system evaluates the reels from left to right and determines a quantity of adjacent reels (including the leftmost reel) that each displays at least one instance of the first individual symbol at one of the symbol display areas associated with that reel. In this example, if at least the leftmost reel and the two reels displayed immediately to the right of the leftmost reel (i.e., three adjacent reels including the leftmost reel and the two reels adjacent to it) each displays at least one instance of the first individual symbol at one of the symbol display areas associated with that reel, for each of the adjacent reels, the gaming system determines a modifier for that reel. In this example, the modifier for that reel includes a multiplier having a multiplier value, in this example, the multiplier value of a multiplier for a given reel is equal to a quantity of instances of the first individual symbol that are displayed at the symbol display areas associated with that reel.

The gaming system employs each determined multiplier to determine a total award for the first individual symbol. Specifically, in this example, the gaming system determines a base count and a base award for the first individual symbol. The base award is based on: (a) the first individual symbol, and (b) the determined base count. In this example, the base count is equal to the determined quantity of adjacent reels. Thus, in this example, the gaming system determines the base award based on: (a) the first individual symbol, and (b) the quantity of adjacent reels that each displays at least one indication of the first individual symbol at the symbol display areas associated with that reel. The gaming system determines the total award for the first individual symbol by multiplying the determined base award by each of the determined multipliers. The gaming system repeats this award determination process for each additional individual symbol displayed at one or more of the symbol display areas associated with the leftmost reel (if any), and provides any determined awards.

It should be appreciated that the designated quantity may be any suitable quantity, such as two, four, or five. It should also be appreciated that the first reel may be any suitable reel, such as the rightmost reel or one of the middle reels.

Returning to FIG. 2, in this example, one instance of the individual A symbol (i.e., instance 221*a*) was displayed at one of the symbol display areas (i.e., symbol display area 220*a*) associated with the leftmost reel (i.e., reel 210*a*). Additionally, a plurality of instances of the individual J symbol (i.e., the three instances included in instance 221*f* of the multi-component JJJ symbol and instance 221*k*) were displayed at the symbol display areas (i.e., symbol display areas 220*f* and 220*k*) associated with the leftmost reel (i.e., reel 210*a*). Thus, the gaming system made an award determination for each of the individual A symbol and the individual J symbol.

Turning to the individual A symbol, the gaming system evaluated the reels from left to right and determined that two adjacent reels (including the leftmost reel) each displayed at least one instance of the individual A symbol at the symbol display areas associated with that reel. Specifically, the gaming system determined that: (a) leftmost reel 210*a* displayed instance 221*a* of the individual A symbol at symbol display area 220*a* associated with reel 210*a*; and (b) reel 210*b*, which was displayed immediately to the right of reel 210*a*, displayed instance 221*l* of the individual A symbol at symbol display area 220*l* associated with reel 210*b*. However, the determined quantity of two adjacent reels was less than the designated quantity of three; therefore, the gaming system determined not to determine or provide any awards for the individual A symbol.

Turning to the individual J symbol, the gaming system evaluated the reels from left to right and determined that four adjacent reels including the leftmost reel each displayed at least one instance of the individual J symbol at the symbol display areas associated with that reel. Specifically, the gaming system determined that: (a) leftmost reel 210*a* displayed the three instances of the individual J symbol included in instance 221*f* of the multi-component JJJ symbol displayed at symbol display area 220*f* associated with reel 210*a*, and displayed instance 221*k* of the individual J symbol at symbol display area 220*k* associated with reel 210*a*; (b) reel 210*b*, which was displayed immediately to the right of reel 210*a*, displayed the two instances of the individual J symbol included in instance 221*g* of the multi-component JJ symbol displayed at symbol display area 220*g* associated with reel 210*b*; (c) reel 210*c*, which was displayed immediately to the right of reel 210*b*, displayed instance 221*h* of the individual J symbol at symbol display area 220*h* associated with reel 210*c*; and (d) reel 210*d*, which was displayed immediately to the right of reel 210*c*, displayed instance 221*d* of the individual J symbol at symbol display area 220*d* associated with reel 210*d*, instance 221*i* of the individual J symbol at symbol display area 220*i* associated with reel 210*d*, and instance 221*n* of the individual J symbol at symbol display area 220*n* associated with reel 210*d*.

The gaming system determined that the determined quantity of four adjacent reels was at least equal to and, in this instance greater than, the designated quantity of three. Accordingly, the gaming system determined multipliers for the four adjacent reels for use in determining a total award for the individual J symbol.

A total of four instances of the individual J symbol were displayed at the symbol display areas associated with reel 210*a*; therefore, the gaming system determined a multiplier having a multiplier value of 4× for reel 210*a*. A total of two instances of the individual J symbol were displayed at the symbol display areas associated with reel 210*b*; therefore, the gaming system determined a multiplier having a multiplier value of 2× for reel 210*b*. A total of one instance of the individual J symbol was displayed at the symbol display areas associated with reel 210*c*; therefore, the gaming system determined a multiplier having a multiplier value of 1× for reel 210*c*. A total of three instances of the individual J symbol were displayed at the symbol display areas associated with reel 210*d*; therefore, the gaming system determined a multiplier having a multiplier value of 3× for reel 210*d*.

In this example, since the determined quantity of adjacent reels was four, the gaming system determined a base count of four. The gaming system determined a base award of 50 credits based on: (a) the individual J symbol, and (b) the determined base count of four. In other words, the gaming system determined the base award of 50 credits based on the display of at least one instance of the individual J symbol at the symbol display areas associated with each of four adjacent reels. To determine the total award for the individual J symbol, the gaming system multiplied the determined base award of 50 credits by the determined multipliers having multiplier values of 4×, 2×, 1×, and 3×, resulting in a total award of 1,200 credits for the individual J symbol. The gaming system displayed the award of 1,200 credits at award meter 218, and updated the player's credit balance in credit meter 214 to reflect the 1,200 credit award.

Figure 3A:
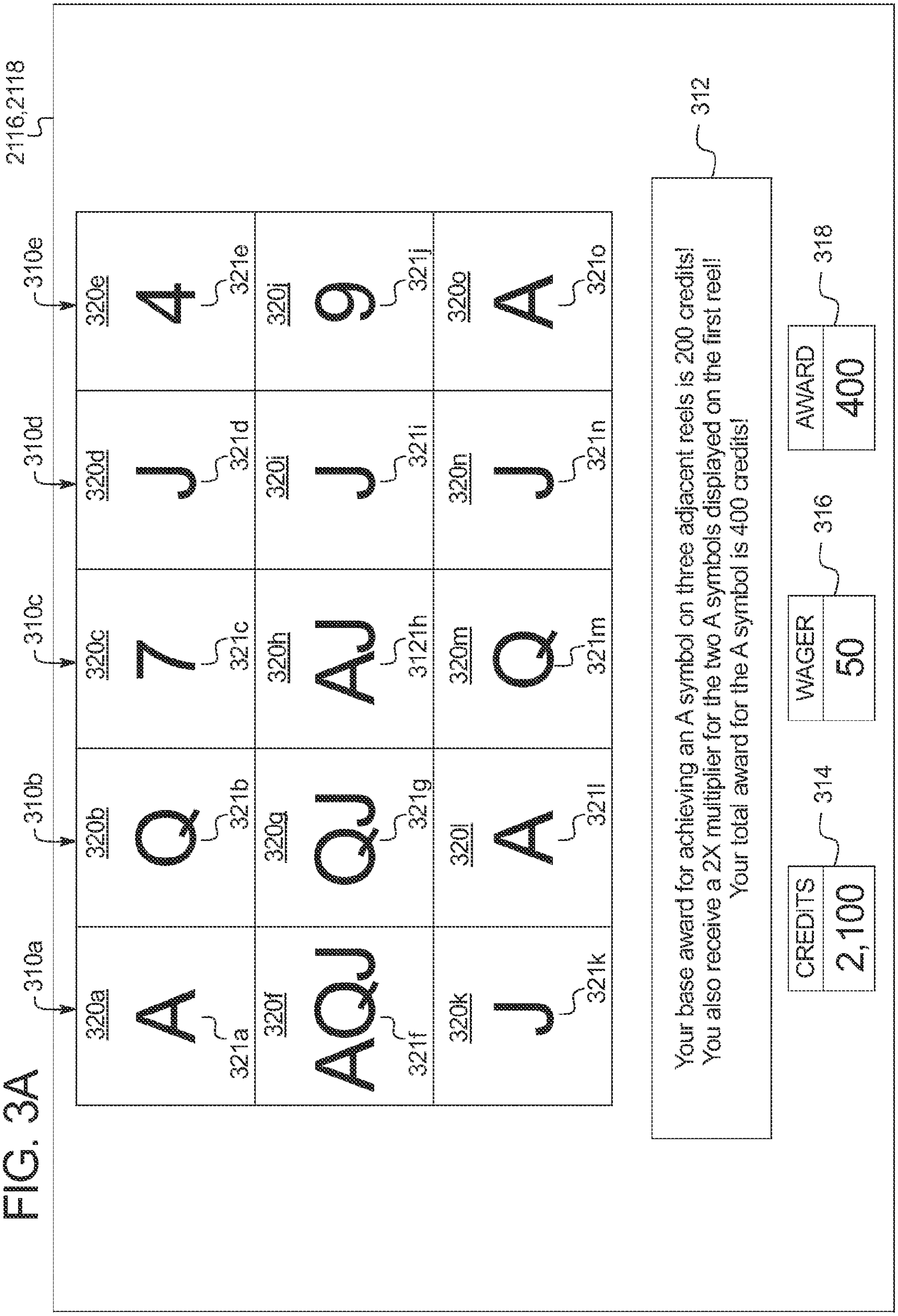
FIGS. 3A, 3B, and 3C illustrate screen shots of another example embodiment of the gaming system of the present disclosure configured to provide multiway evaluation for a game in which one or more displayed multi-component symbols are utilized to determine one or more modifiers that are employed to determine one or more awards.
Figure 3B:
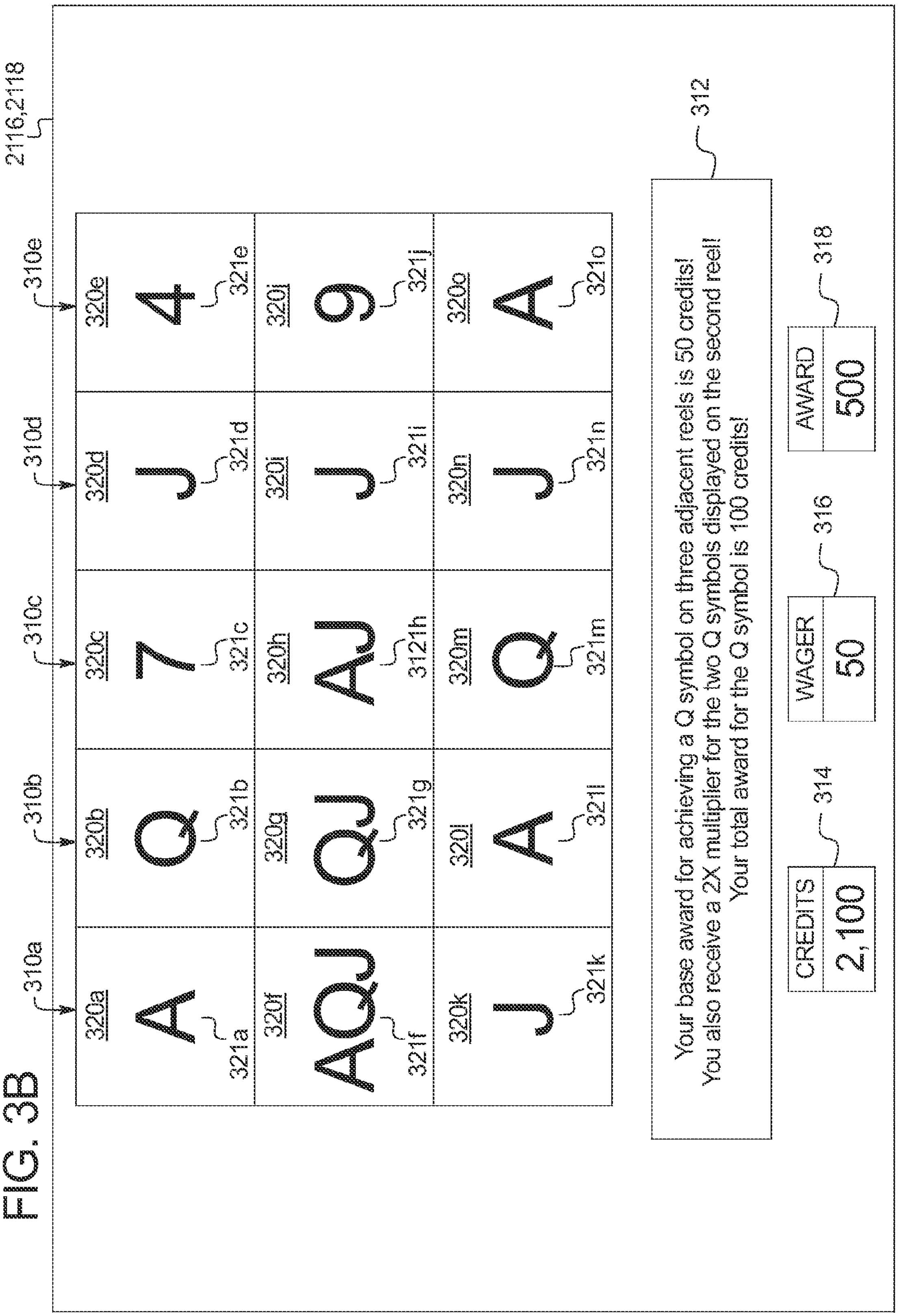
Figure 3C:
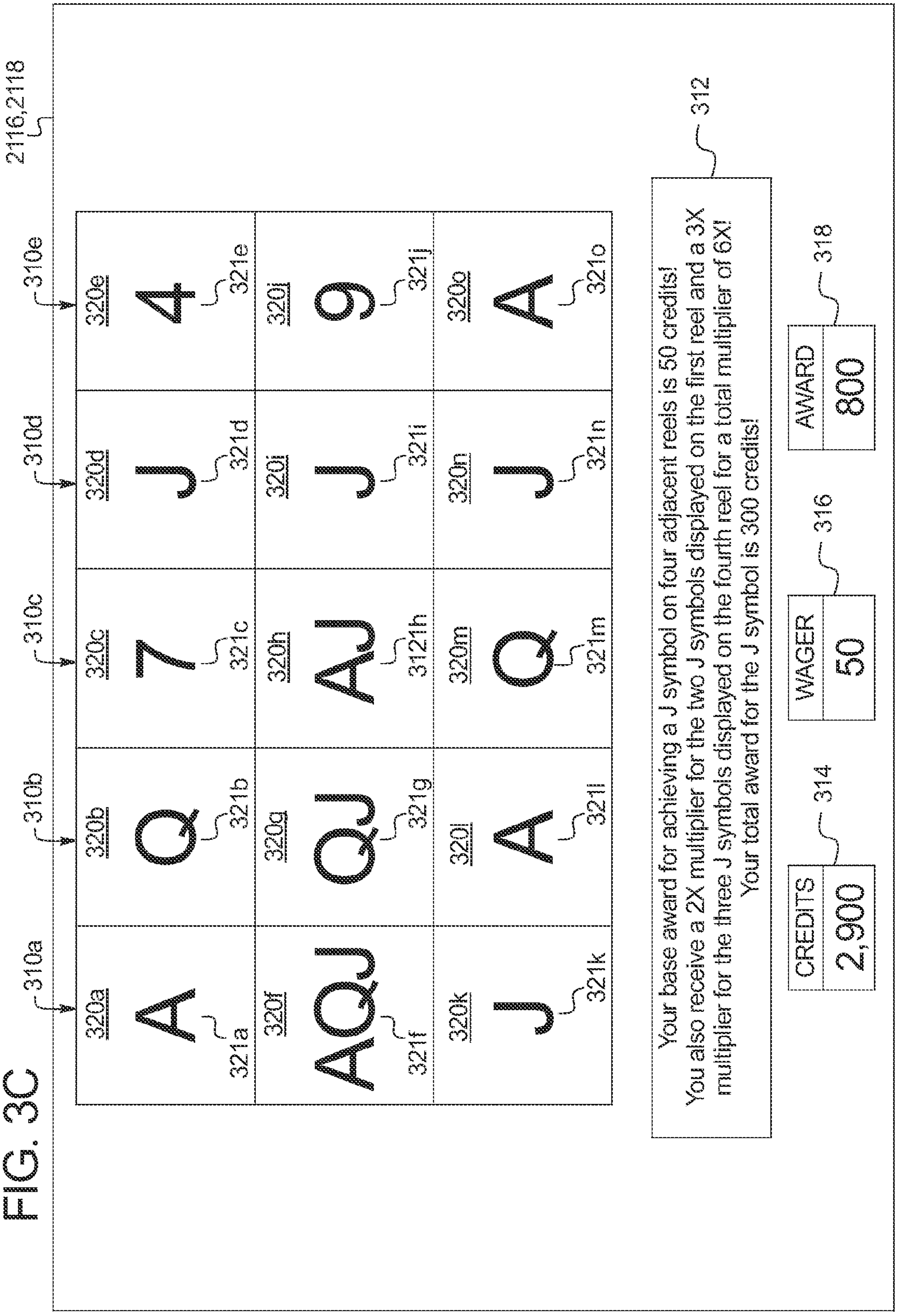

FIGS. 3A, 3B, and 3C illustrate screen shots of another example embodiment of the gaming system of the present disclosure. In this example, the gaming system is configured to operate the primary slot-type wagering game described above with respect to FIG. 2. As illustrated in FIGS. 3A, 3B, and 3C, upon initiation of a play of the primary wagering game for the maximum wager of 50 credits in this example, the gaming system determined and displayed an outcome for the play of the primary wagering game by, for each of the reels, spinning that reel and displaying a plurality of the symbols on that reel at the symbol display areas associated with that reel. Specifically, the gaming system:

(a) spun reel 310*a* and displayed: an instance 321*a* of the individual A symbol at symbol display area 320*a*; an instance 321*f* of the multi-component AQJ symbol, which includes one instance of each of the individual A, Q, and J symbols, at symbol display area 320*f*; and an instance 321*k* of the individual J symbol at symbol display area 320*k;*

(b) spun reel 310*b* and displayed: an instance 321*b* of the individual Q symbol at symbol display area 320*b*; an instance 321*g* of the multi-component QJ symbol, which includes one instance of each of the individual Q and J symbols, at symbol display area 320*g*; and an instance 321*l* of the individual A symbol at symbol display area 320*l;*

(c) spun reel 310*c* and displayed: an instance 321*c* of the individual 7 symbol symbol at symbol display area 320*c*; an instance 321*h* of the multi-component AJ symbol, which includes one instance of each of the individual A and J symbols, at symbol display area 320*h*; and an instance of the individual Q symbol at symbol display area 321*m;*

(d) spun reel 310*d* and displayed: an instance 321*d* of the individual J symbol at symbol display area 320*d*, an instance 321*i* of the individual J symbol at symbol display area 320*i*, and an instance 321*m* of the individual J symbol at symbol display area 320*m*; and (e) spun reel 310*e* and displayed: an instance 321*e* of the individual 4 symbol at symbol display area 320*e*; an instance 321*j* of the individual 9 symbol at symbol display area 320*j*, and an instance 321*o* of the individual A symbol at symbol display area 320*o*.

In this example, a plurality of instances of the individual A symbol (i.e., instance 321*a* and the instance included in instance 321*f* of the multi-component AQJ symbol) were displayed at the symbol display areas (i.e., symbol display areas 320*a* and 320*f*) associated with the leftmost reel (i.e., reel 310*a*). Additionally, one instance of the individual Q symbol (i.e., the instance included in instance 321*f* of the multi-component AQJ symbol) was displayed at one of the symbol display areas (i.e., symbol display area 320*f*) associated with the leftmost reel (i.e., reel 310*a*). Further, a plurality of instances of the individual J symbol (i.e., the instance included in instance 321*f* of the multi-component AQJ symbol and instance 321*k*) were displayed at the symbol display areas (i.e., symbol display areas 320*f* and 320*k*) associated with the leftmost reel (i.e., reel 310*a*). Thus, the gaming system made an award determination for each of the individual A symbol, the individual Q symbol, and the individual J symbol.

Turning to FIG. 3A and the individual A symbol, the gaming system evaluated the reels from left to right and determined that three adjacent reels (including the leftmost reel) each displayed at least one instance of the individual A symbol at the symbol display areas associated with that reel. Specifically, the gaming system determined that: (a) leftmost reel 310*a* displayed instance 321*a* of the individual A symbol at symbol display area 320*a* associated with reel 310*a*, and displayed the instance of the individual A symbol included in instance 321*f* of the multi-component AQJ symbol displayed at symbol display area 320*f* associated with reel 310*a*; (b) reel 310*b*, which was displayed immediately to the right of reel 310*a*, displayed instance 321*l* of the individual A symbol at symbol display area 320*l* associated with reel 320*b*; and (c) reel 310*c*, which was displayed immediately to the right of reel 310*b*, displayed the instance of the individual A symbol included in instance 321*h* of the multi-component AJ symbol displayed at symbol display area 320*h* associated with reel 310*c*.

The gaming system determined that the determined quantity of three adjacent reels was at least equal to the designated quantity of three. Accordingly, the gaming system determined multipliers for the three adjacent reels for use in determining a total award for the individual A symbol.

A total of two instances of the individual A symbol were displayed at the symbol display areas associated with reel 310*a*; therefore, the gaming system determined a multiplier having a multiplier value of 2× for reel 310*a*. A total of one instance of the individual A symbol was displayed at the symbol display areas associated with reel 310*b*; therefore, the gaming system determined a multiplier having a multiplier value of 1× for reel 310*b*. A total of one instance of the individual A symbol was displayed at the symbol display areas associated with reel 310*c*; therefore, the gaming system determined a multiplier having a multiplier value of 1× for reel 310*c*.

In this example, since the determined quantity of adjacent reels was three, the gaming system determined a base count of three. The gaming system determined a base award of 200 credits based on: (a) the individual A symbol, and (b) the determined base count of three. In other words, the gaming system determined the base award of 200 credits based on the display of at least one instance of the individual A symbol at the symbol display areas associated with each of three adjacent reels. To determine the total award for the individual A symbol, the gaming system multiplied the determined base award of 200 credits by the determined multipliers having multiplier values of 2×, 1×, and 1×, resulting in a total award of 400 credits for the individual A symbol. The gaming system displayed the award of 400 credits at award meter 318.

Turning to FIG. 3B and the individual Q symbol, the gaming system evaluated the reels from left to right and determined that three adjacent reels including the leftmost reel each displayed at least one instance of the individual Q symbol at the symbol display areas associated with that reel. Specifically, the gaming system determined that: (a) leftmost reel 310*a* displayed the instance of the individual Q symbol included in instance 321*f* of the multi-component AQJ symbol displayed at symbol display area 320*f* associated with reel 310*a*; (b) reel 310*b*, which was displayed immediately to the right of reel 310*a*, displayed instance 321*b* of the individual Q symbol at symbol display area 320*b* associated with reel 320*b* and the instance of the individual Q symbol included in instance 321*g* of the multi-component QJ symbol displayed at symbol display area 320*g* associated with reel 320*b*; and (c) reel 310*c*, which was displayed immediately to the right of reel 310*b*, displayed instance 321*m* of the individual Q symbol at symbol display area 320*m* associated with reel 320*c*.

The gaming system determined that the determined quantity of three adjacent reels was at least equal to the designated quantity of three. Accordingly, the gaming system determined multipliers for the three adjacent reels for use in determining a total award for the individual Q symbol.

A total of one instance of the individual Q symbol was displayed at the symbol display areas associated with reel 310*a*; therefore, the gaming system determined a multiplier having a multiplier value of 1× for reel 310*a*. A total of two instances of the individual Q symbol were displayed at the symbol display areas for reel 310*b*; therefore, the gaming system determined a multiplier having a multiplier value of 2× for reel 310*b*. A total of one instance of the individual Q symbol was displayed at the symbol display areas associated with reel 310*c*; therefore, the gaming system determined a multiplier having a multiplier value of 1× associated with reel 310*c*.

In this example, since the determined quantity of adjacent reels was three, the gaming system determined a base count of three. The gaming system determined a base award of 50 credits based on: (a) the individual Q symbol, and (b) the determined base count of three. In other words, the gaming system determined the base award of 50 credits based on the display of at least one instance of the individual Q symbol at the symbol display areas associated with each of three adjacent reels. To determine the total award for the individual Q symbol, the gaming system multiplied the determined base award of 50 credits by the multipliers having multiplier values of 1×, 2×, and 1×, resulting in a total award of 100 credits for the individual Q symbol. The gaming system updated award meter 318 to reflect the 100 credit award.

Turning to FIG. 3C and the individual J symbol, the gaming system evaluated the reels from left to right and determined that four adjacent reels including the leftmost reel each displayed at least one instance of the individual J symbol at the symbol display areas associated with that reel. Specifically, the gaming system determined that: (a) leftmost reel 310*a* displayed the instance of the individual J symbol included in instance 321*f* of the multi-component AQJ symbol displayed at symbol display area 320*f* associated with reel 310*a*, and displayed instance 321*k* of the individual J symbol at symbol display area 320*k* associated with reel 310*a*; (b) reel 310*b*, which was displayed immediately to the right of reel 310*a*, displayed the instance of the individual J symbol included in instance 321*g* of the multi-component QJ symbol displayed at symbol display area 320*g* associated with reel 310*b*; (c) reel 310*c*, which was displayed immediately to the right of reel 310*b*, displayed the instance of the individual J symbol included in instance 321*h* of the multi-component AJ symbol displayed at symbol display area 320*h* associated with reel 310*c*; and (d) reel 310*d*, which was displayed immediately to the right of reel 310*c*, displayed instance 321*d* of the individual J symbol at symbol display area 320*d* associated with reel 310*d*, instance 321*i* of the individual J symbol at symbol display area 320*i* associated with reel 310*d*, and instance 321*n* of the individual J symbol at symbol display area 320*n* associated with reel 310*d*.

The gaming system determined that the determined quantity of four adjacent reels was at least equal to and, in this instance, greater than, than the designated quantity of three. Accordingly, the gaming system determined multipliers for the four adjacent reels for use in determining a total award for the individual J symbol.

A total of two instances of the individual J symbol were displayed at the symbol display areas associated with reel 310*a*; therefore, the gaming system determined a multiplier having a multiplier value of 2× for reel 310*a*. A total of one instance of the individual J symbol was displayed at the symbol display areas associated with reel 310*b*; therefore, the gaming system determined a multiplier having a multiplier value of 1× for reel 310*b*. A total of one instance of the individual J symbol was displayed at the symbol display areas associated with reel 310*c*; therefore, the gaming system determined a multiplier having a multiplier value of 1× for reel 310*c*. A total of three instances of the individual J symbol were displayed at the symbol display areas associated with reel 310*d*; therefore, the gaming system determined a multiplier having a multiplier value of 3× for reel 310*d*.

In this example, since the determined quantity of adjacent reels was four, the gaming system determined a base count of four. The gaming system determined a base award of 50 credits based on: (a) the individual J symbol, and (b) the determined base count of four. In other words, the gaming system determined the base award of 50 credits based on the display of at least one instance of the individual J symbol at the symbol display areas associated with each of four adjacent reels. To determine the total award for the individual J symbol, the gaming system multiplied the determined base award of 50 credits by the multipliers having multiplier values of 2×, 1×, 1×, and 3×, resulting in a total award of 300 credits for the individual J symbol. The gaming system updated award meter 318 to reflect the 300 credit award.

Further embodiments of the present disclosure are directed to a gaming system and method providing multiway evaluation for a game in which one or more displayed multi-component symbols are utilized to, in certain instances, determine (at least in part) a base count that is employed to determine one or more awards.

Figure 4A:
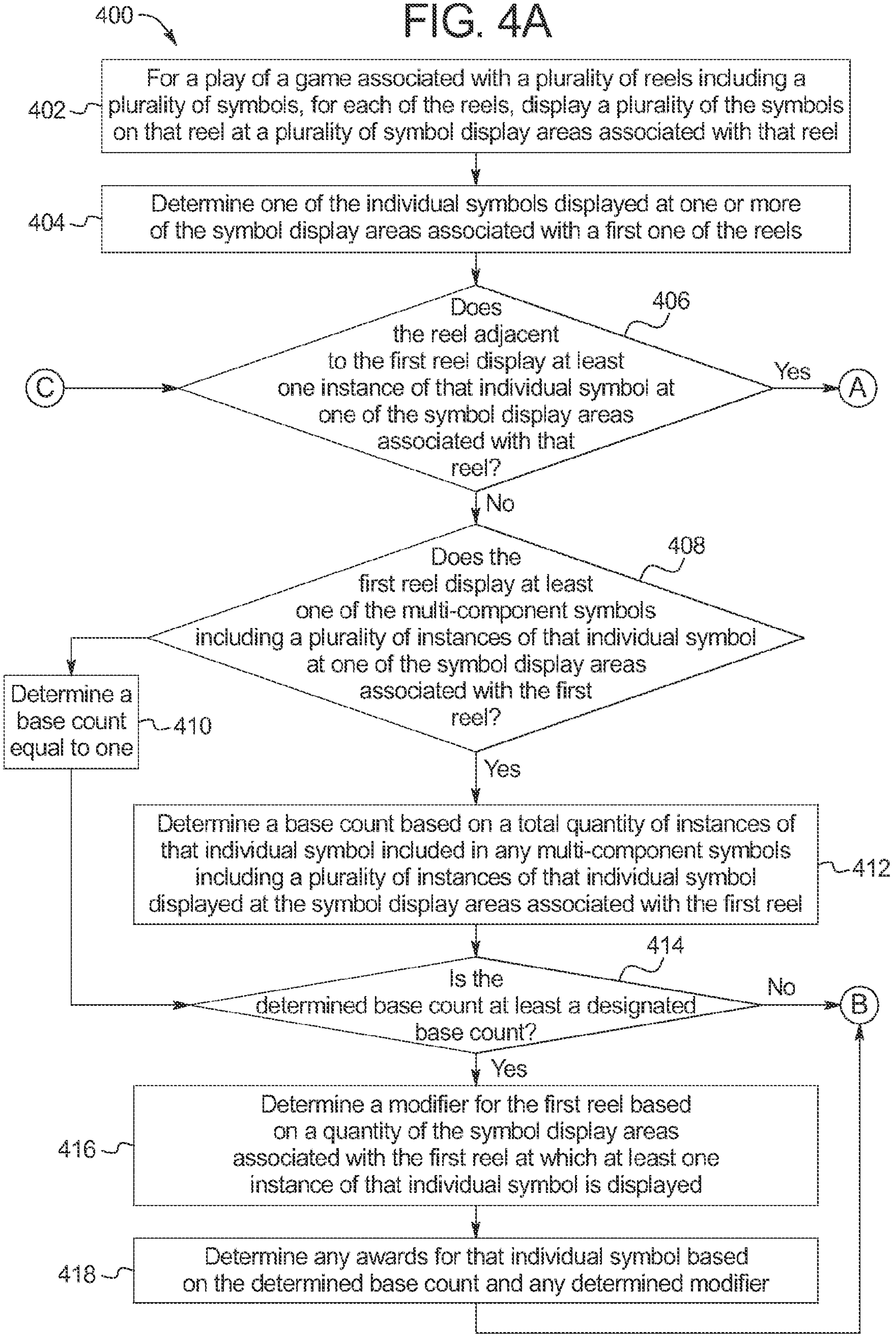
FIGS. 4A and 4B are a flowchart illustrating a method of operating an example embodiment of the gaming system of the present disclosure configured to provide multiway evaluation for a game in which one or more displayed multi-component symbols are utilized to determine a base count that is employed to determine one or more awards.
Figure 4B:
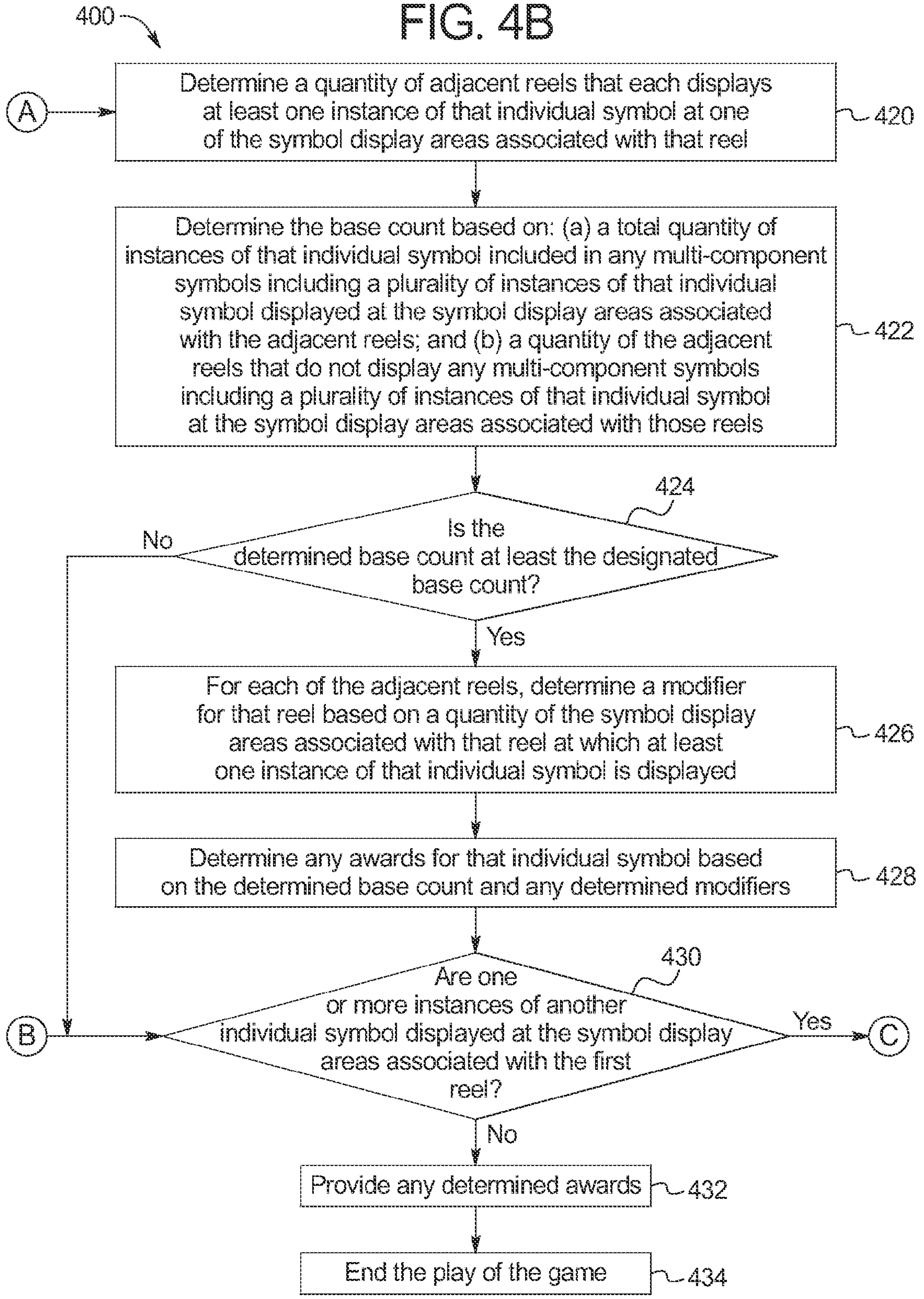

FIGS. 4A and 4B illustrate a flowchart of a process or method 400 for operating an example embodiment of the gaming system of the present disclosure. In various embodiments, process 400 is represented by a set of instructions stored in one or more memories and executed by one or more processors. Although process 400 is described with reference to the flowchart shown in FIGS. 4A and 4B, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In this example, the gaming system is configured to operate a game associated with a plurality of reels including a plurality of symbols. The symbols include a plurality of individual symbols and one or more multi-component symbols. Each of the multi-component symbols includes a plurality of instances of one or more of the individual symbols. The game is also associated with a plurality of symbol display areas. Each of the reels is associated with a plurality of the symbol display areas. For a play of the game, for each of the reels, the gaming system displays a plurality of the symbols on that reel at the symbol display areas associated with that reel, as indicated by block 402. The gaming system determines one of the individual symbols displayed at one or more of the symbol display areas associated with a first reel, as indicated by block 404. The gaming system determines whether the reel adjacent to the first reel displays at least one instance of that individual symbol at one of the symbol display areas associated with that reel, as indicated by diamond 406.

If the reel adjacent to the first reel does not display at least one instance of that individual symbol at one of the symbol display areas associated with that reel, the gaming system determines whether the first reel displays at least one of the multi-component symbols including a plurality of instances of that individual symbol at one of the symbol display areas associated with the first reel, as indicated by diamond 408. If the first reel displays at least one of the multi-component symbols including a plurality of instances of that individual symbol at one of the symbol display areas associated with the first reel, the gaming system determines a base count based on a total quantity of instances of that individual symbol included in any multi-component symbols including a plurality of instances of that individual symbol displayed at the symbol display areas associated with the first reel, as indicated by block 412. If not, the gaming system determines to set the base count equal to a default base count, as indicated by block 410.

The gaming system determines whether the determined base count is at least a designated base count, as indicated by diamond 414. If the determined base count is not at least the designated base count, process 400 proceeds to diamond 430, described below. If the determined base count is at least the designated base count, the gaming system determines a modifier for the first reel based on a quantity of the symbol display areas associated with the first reel at which at least one instance of that individual symbol is displayed, as indicated by block 416. The gaming system determines any awards for that individual symbol based on the determined base count and any determined modifier, as indicated by block 418. Process 400 proceeds to diamond 430, described below.

Returning to diamond 406, if the reel adjacent to the first reel displays at least one instance of that individual symbol at one of the symbol display areas associated with that reel, the gaming system determines a quantity of adjacent reels that each displays at least one instance of that individual symbol at one of the symbol display areas associated with that reel, as indicated by block 420. The gaming system determines the base count based on: (a) a total quantity of instances of that individual symbol included in any multi-component symbols including a plurality of instances of that individual symbol displayed at the symbol display areas associated with the adjacent reels; and (b) a quantity of the adjacent reels that do not display any multi-component symbols including a plurality of instances of that individual symbol at the symbol display areas associated with those reels, as indicated by block 422.

The gaming system determines whether the determined base count is at least a designated base count, as indicated by diamond 424. If the determined base count is not at least the designated base count, process 400 proceeds to diamond 430, described below. If the determined base count is at least the designated base count, the gaming system determines, for each of the adjacent reels, a modifier for that reel based on a quantity of the symbol display areas associated with that reel at which at least one instance of that individual symbol is displayed, as indicated by block 426. The gaming system determines any awards for that individual symbol based on the determined base count and any determined modifiers, as indicated by block 428.

The gaming system determines whether one or more instances of another individual symbol are displayed at the symbol display areas associated with the first reel, as indicated by diamond 430. If one or more instances of another individual symbol are displayed at the symbol display areas associated with the first reel, process 400 returns to diamond 406. If one or more instances of another individual symbol are not displayed at the symbol display areas associated with the first reel, the gaming system provides any determined awards, as indicated by block 432, and ends the play of the game, as indicated by block 434.

Figure 5:
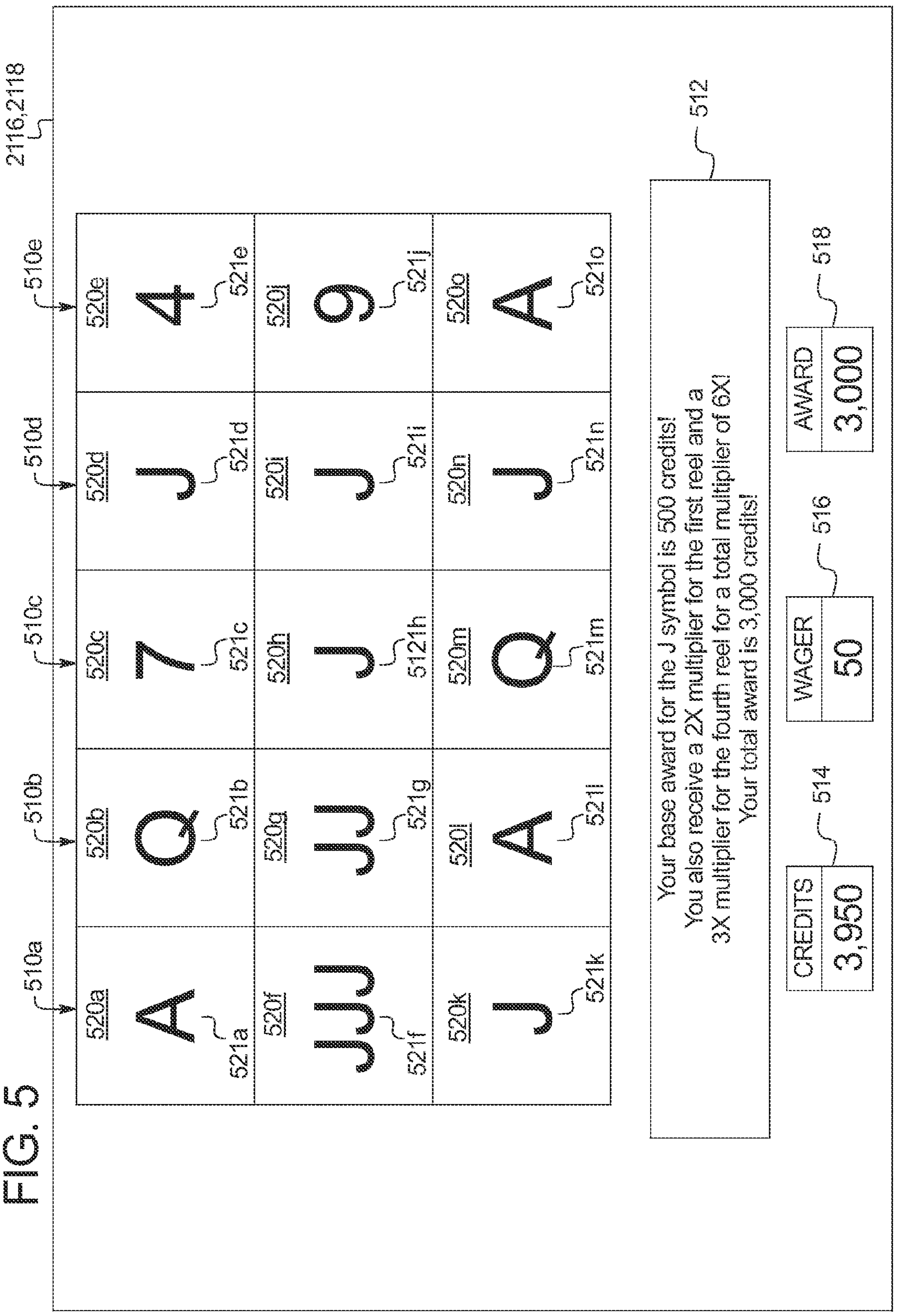
FIG. 5 illustrates a screen shot of an example embodiment of the gaming system of the present disclosure configured to provide multiway evaluation for a game in which one or more displayed multi-component symbols are utilized to determine a base count that is employed to determine one or more awards.

FIG. 5 illustrates a screen shot of an example embodiment of the gaming system of the present disclosure. In this example, the gaming system is configured to operate the primary slot-type wagering game described above with respect to FIG. 2. Upon initiation of a play of the primary wagering game for the maximum wager of 50 credits in this example, the gaming system determined and displayed an outcome for the play of the primary wagering game by, for each of the reels, spinning that reel and displaying a plurality of the symbols on that reel at the symbol display areas associated with that reel. Specifically, the gaming system:

(a) spun reel 510*a* and displayed: an instance 521*a* of the individual A symbol at symbol display area 520*a*; an instance 521*f* of the multi-component JJJ symbol, which includes three instances of the individual J symbol, at symbol display area 520*f*; and an instance 521*k* of the individual J symbol at symbol display area 520*k;*

(b) spun reel 510*b* and displayed: an instance 521*b* of the individual Q symbol at symbol display area 520*b*; an instance 521*g* of the multi-component JJ symbol, which includes two instances of the individual J symbol, at symbol display area 520*g*; and an instance 521*l* of the individual A symbol at symbol display area 520*l;*

(c) spun reel 510*c* and displayed: an instance 521*c* of the individual 7 symbol symbol at symbol display area 520*c*, an instance 521*h* of the individual J symbol at symbol display area 520*h*, and an instance of the individual Q symbol at symbol display area 521*m;*

(d) spun reel 510*d* and displayed: an instance 521*d* of the individual J symbol at symbol display area 520*d*, an instance 521*i* of the individual J symbol at symbol display area 520*i*, and an instance 521*m* of the individual J symbol at symbol display area 520*m*; and (e) spun reel 510*e* and displayed: an instance 521*e* of the individual 4 symbol at symbol display area 520*e*; an instance 521*j* of the individual 9 symbol at symbol display area 520*j*, and an instance 521*o* of the individual A symbol at symbol display area 520*o*.

Generally, for a play of the primary wagering game in this example, the gaming system makes an award determination for each individual symbol displayed at one or more of the symbol display areas associated with a first reel. More specifically, for a first individual symbol displayed at one or more of the symbol display areas associated with the first reel. The gaming system determines whether the reel adjacent to the first reel displays at least one instance of the first individual symbol at one of the symbol display areas associated with that reel.

If the reel adjacent to the first reel does not display at least one instance of the first individual symbol at one of the symbol display areas associated with that reel, the gaming system determines whether the first reel displays at least one of the multi-component symbols including a plurality of instances of the first individual symbol at one of the symbol display areas associated with the first reel. If the first reel displays at least one of the multi-component symbols including a plurality of instances of the first individual symbol at one of the symbol display areas associated with the first reel, the gaming system determines a base count based on a total quantity of instances of the first individual symbol included in any multi-component symbols including a plurality of instances of the first individual symbol displayed at the symbol display areas associated with the first reel. If not, the gaming system determines to set the base count equal to a default base count.

The gaming system determines whether the determined base count is at least a designated base count. If the determined base count is not at least the designated base count, the gaming system ends the award determination process with respect to the first individual symbol, and repeats the award determination process for each additional individual symbol displayed at one or more of the symbol display areas associated with the first reel (if any). If the determined base count is at least the designated base count, the gaming system determines a modifier for the first reel based on a quantity of the symbol display areas associated with the first reel at which at least one instance of the first individual symbol is displayed. The gaming system determines any awards for that individual symbol based on the determined base count and any determined modifier. The gaming system ends the award determination process with respect to the first individual symbol, and repeats the award determination process for each additional individual symbol displayed at one or more of the symbol display areas associated with the first reel (if any).

If, on the other hand, the reel adjacent to the first reel displays at least one instance of the first individual symbol at one of the symbol display areas associated with that reel, the gaming system determines a quantity of adjacent reels that each displays at least one instance of the first individual symbol at one of the symbol display areas associated with that reel. In this instance, the gaming system determines the base count based on: (a) a total quantity of instances of the first individual symbol included in any multi-component symbols including a plurality of instances of the first individual symbol displayed at the symbol display areas associated with the adjacent reels; and (b) a quantity of the adjacent reels that do not display any multi-component symbols including a plurality of instances of the first individual symbol at the symbol display areas associated with those reels.

The gaming system determines whether the determined base count is at least the designated base count. If the determined base count is not at least the designated base count, the gaming system ends the award determination process with respect to the first individual symbol, and repeats the award determination process for each additional individual symbol displayed at one or more of the symbol display areas associated with the first reel (if any). If the determined base count is at least the designated base count, the gaming system determines, for each of the adjacent reels, a modifier for that reel based on a quantity of the symbol display areas associated with that reel at which at least one instance of the first individual symbol is displayed. The gaming system determines any awards for that individual symbol based on the determined base count and any determined modifiers. The gaming system ends the award determination process with respect to the first individual symbol, and repeats the award determination process for each additional individual symbol displayed at one or more of the symbol display areas associated with the first reel (if any). The gaming system provides any determined awards.

In this example, the first reel is the leftmost reel, the designated base count is three, and the default base count is one (or any other suitable base count). Thus, in this example, the gaming system makes an award determination for each individual symbol displayed at one or more of the symbol display areas associated with the leftmost reel.

Additionally, in this example, if: (a) the reel displayed immediately to the right of the leftmost reel (i.e., the reel adjacent to the leftmost reel) does not display at least one instance of the first individual symbol at one of the symbol display areas associated with that reel, and (b) the leftmost reel does not display at least one multi-component symbol including a plurality of instances of the first individual symbol at one of the symbol display areas associated with the leftmost reel, the gaming system sets the base count equal to the default base count of one.

Further, in this example, if: (a) the reel displayed immediately to the right of the leftmost reel (i.e., the reel adjacent to the leftmost reel) does not display at least one instance of the first individual symbol at one of the symbol display areas associated with that reel, and (b) the leftmost reel displays at least one multi-component symbol including a plurality of instances of the first individual symbol at one of the symbol display areas associated with the leftmost reel, the gaming system sets the base count equal to a total quantity of instances of the first individual symbol included in any multi-component symbols including a plurality of instances of the first individual symbol displayed at the symbol display areas associated with the leftmost reel.

Additionally, in this example, if the reel displayed immediately to the right of the leftmost reel (i.e., the reel adjacent to the leftmost reel) displays at least one instance of the first individual symbol at one of the symbol display areas associated with that reel, the gaming system determines a quantity of adjacent reels that each displays at least one instance of the first individual symbol at the symbol display areas associated with that reel, and sets the base count equal to a sum of: (a) a total quantity of instances of the first individual symbol included in any multi-component symbols including a plurality of instances of the first individual symbol displayed at the symbol display areas associated with the adjacent reels; and (b) a quantity of the adjacent reels that do not display any multi-component symbols including a plurality of instances of the first individual symbol at the symbol display areas associated with those reels.

In this example, any determined modifier for a given reel includes a multiplier having a multiplier value. In this example, for the first individual symbol, the multiplier value of a multiplier for that reel is equal to a quantify of the symbol display areas associated with that reel at which at least one instance of the first individual symbol is displayed. The gaming system employs each determined multiplier to determine a total award for the first individual symbol. Specifically, in this example, the gaming system determines a base award for the first individual symbol based on: (a) the first individual symbol, and (b) the determined base count. The gaming system determines the total award for the first individual symbol by multiplying the determined base award by each of the determined multipliers.

Returning to FIG. 5, in this example, one instance of the individual A symbol (i.e., instance 521*a*) was displayed at one of the symbol display areas (i.e., symbol display area 520*a*) associated with the leftmost reel (i.e., reel 510*a*). Additionally, a plurality of instances of the individual J symbol (i.e., the three instances included in instance 521*f* of the multi-component JJJ symbol and instance 521*k*) were displayed at the symbol display areas (i.e., symbol display areas 520*f* and 520*k*) associated with the leftmost reel (i.e., reel 510*a*). Thus, the gaming system made an award determination for each of the individual A symbol and the individual J symbol.

Turning to the individual A symbol, the gaming system evaluated reel 510*b* (i.e., the reel immediately to the right of leftmost reel 510*a*) and determined that reel 510*b* displayed instance 521*l* of the individual A symbol at symbol display area 520*l* associated with reel 510*b*. Accordingly, the gaming system evaluated the reels from left to right and determined that two adjacent reels (including the leftmost reel) each displayed at least one instance of the individual A symbol at the symbol display areas associated with that reel. Specifically, the gaming system determined that: (a) leftmost reel 510*a* displayed instance 521*a* of the individual A symbol at symbol display area 520*a* associated with reel 510*a*; and (b) reel 510*b*, which was displayed immediately to the right of reel 510*a*, displayed instance 521*l* of the individual A symbol at symbol display area 520*l* associated with reel 510*b*.

Since reel 510*b* displayed immediately to the right of reel 510*a* displayed at least one instance of the individual A symbol at one of the symbol display areas associated with that reel, the gaming system set the base count equal to a sum of: (a) a total quantity of instances of the individual A symbol included in any multi-component symbols including a plurality of instances of the individual A symbol displayed at the symbol display areas associated with reels 510*a* and 510*b*; and (b) a quantity of reels 510*a* and 510*b* that did not display any multi-component symbols including a plurality of instances of the individual A symbol at the symbol display areas associated with those reels.

In this example, neither of reels 510*a* and 510*b* displayed a multi-component symbol including a plurality of instances of the individual A symbol at the symbol display areas associated with those reels. Accordingly, the gaming system set the base count equal to two (i.e., a quantity of reels 510*a* and 510*b* that did not display any multi-component symbols including a plurality of instances of the individual A symbol at the symbol display areas associated with those reels). Since the determined base count of two is not at least equal to the designated base count of three, the gaming system determined not to determine or provide any awards for the individual A symbol.

Turning to the individual J symbol, the gaming system evaluated reel 510*b* (i.e., the reel immediately to the right of leftmost reel 510*a*) and determined that reel 510*b* displayed the two instances of the individual J symbol included in instance 521*g* of the multi-component JJ symbol displayed at symbol display area 520*g* associated with reel 510*b*. Accordingly, the gaming system evaluated the reels from left to right and determined that four adjacent reels including the leftmost reel each displayed at least one instance of the individual J symbol at the symbol display areas associated with that reel. Specifically, the gaming system determined that: (a) leftmost reel 510*a* displayed the three instances of the individual J symbol included in instance 521*f* of the multi-component JJJ symbol displayed at symbol display area 520*f* associated with reel 510*a*, and displayed instance 521*k* of the individual J symbol at symbol display area 520*k* associated with reel 510*a*; (b) reel 510*b*, which was displayed immediately to the right of reel 510*a*, displayed the two instances of the individual J symbol included in instance 521*g* of the multi-component JJ symbol displayed at symbol display area 520*g* associated with reel 510*b*; (c) reel 510*c*, which was displayed immediately to the right of reel 510*b*, displayed instance 521*h* of the individual J symbol at symbol display area 520*h* associated with reel 510*c*; and (d) reel 510*d*, which was displayed immediately to the right of reel 510*c*, displayed instance 521*d* of the individual J symbol at symbol display area 520*d* associated with reel 510*d*, instance 521*i* of the individual J symbol at symbol display area 520*i* associated with reel 510*d*, and instance 521*n* of the individual J symbol at symbol display area 520*n* associated with reel 510*d*.

Since reel 510*b* displayed immediately to the right of reel 510*a* displayed at least one instance of the individual J symbol at one of the symbol display areas associated with that reel, the gaming system set the base count equal to a sum of: (a) a total quantity of instances of the individual J symbol included in any multi-component symbols including a plurality of instances of the individual J symbol displayed at the symbol display areas associated with reels 510*a*, 510*b*, 510*c*, and 510*d*; and (b) a quantity of reels 510*a*, 510*b*, 510*c*, and 510*d* that did not display any multi-component symbols including a plurality of instances of the individual J symbol at the symbol display areas associated with those reels.

In this example, reels 510*a* and 510*b* each displayed a multi-component symbol including a plurality of instances of the individual J symbol at the symbol display areas associated with those reels. Specifically, reel 510*a* displayed instance 521*f* of the multi-component JJJ symbol, which includes three instances of the individual J symbol, and reel 510*b* displayed instance 521*g* of the multi-component JJ symbol, which includes two instances of the individual J symbol. Thus, the gaming system determined a total quantity of five instances of the individual J symbol included in instance 521*f* of the multi-component JJJ symbol and in instance 521*g* of the multi-component JJ symbol displayed at the symbol display areas associated with reels 520*a* and 520*b*. The gaming system also determined a quantity of two of reels 510*a*, 510*b*, 510*c*, and 510*d* that did not display one of the multi-component symbols including a plurality of instances of the individual J symbol at the symbol display areas associated with those reels (i.e., reels 510*c* and 510*d*).

Accordingly, the gaming system set the base count equal to seven. The gaming system determined that the determined base count of seven was at least equal to and, in this instance greater than, the designated base count of three. Accordingly, the gaming system determined multipliers for the four adjacent reels for use in determining a total award for the individual J symbol.

A total of two symbol display areas associated with reel 510*a* each displayed at least one instance of the individual J symbol; therefore, the gaming system determined a multiplier having a multiplier value of 2× for reel 510*a*. A total of one symbol display area associated with reel 510*b* displayed at least one instance of the individual J symbol; therefore, the gaming system determined a multiplier having a multiplier value of 1× for reel 510*b*. A total of one symbol display area associated with reel 510*c* displayed at least one instance of the individual J symbol; therefore, the gaming system determined a multiplier having a multiplier value of 1× for reel 510*c*. A total of three symbol display areas associated with reel 510*d* each displayed at least one instance of the individual J symbol; therefore, the gaming system determined a multiplier having a multiplier value of 3× for reel 510*d*.

In this example, the gaming system determined a base award of 300 credits based on: (a) the individual J symbol, and (b) the determined base count of seven. To determine the total award for the individual J symbol, the gaming system multiplied the determined base award of 300 credits by the determined multipliers having multiplier values of 2×, 1×, 1×, and 3×, resulting in a total award of 3,000 credits for the individual J symbol. The gaming system displayed the award of 3,000 credits at award meter 518, and updated the player's credit balance in credit meter 514 to reflect the 3,000 credit award.

In certain embodiments, at least one of the multi-component symbols includes one or more instances of a first individual symbol and one or more instances of a second different individual symbol. For example, one of the multi-component symbols is a KJJ multi-component symbol, which includes two instances of the individual J symbol and one instance of the individual K symbol. It should be appreciated that such multi-component symbols do not alter or modify the manner in which the above-described award determination is performed. For example, if instance 521*f* of the multi-component JJJ symbol was instead an instance of the multi-component KJJ symbol, the gaming system would have determined the base count to be six rather than seven, and would have adjusted the base award accordingly.

Certain embodiments of the present disclosure are directed to a gaming system and method providing multiway evaluation for a game in which one or more displayed multi-component symbols are utilized to, in certain instances: (a) determine (at least in part) one or more modifiers that are employed to determine one or more awards, (b) determine (at least in part) a base count that is employed to determine one or more awards, or (c) determine (at least in part) one or more modifiers that are employed to determine one or more awards and determine (at least in part) a base count that is employed to determine one or more awards.

Figure 6A:
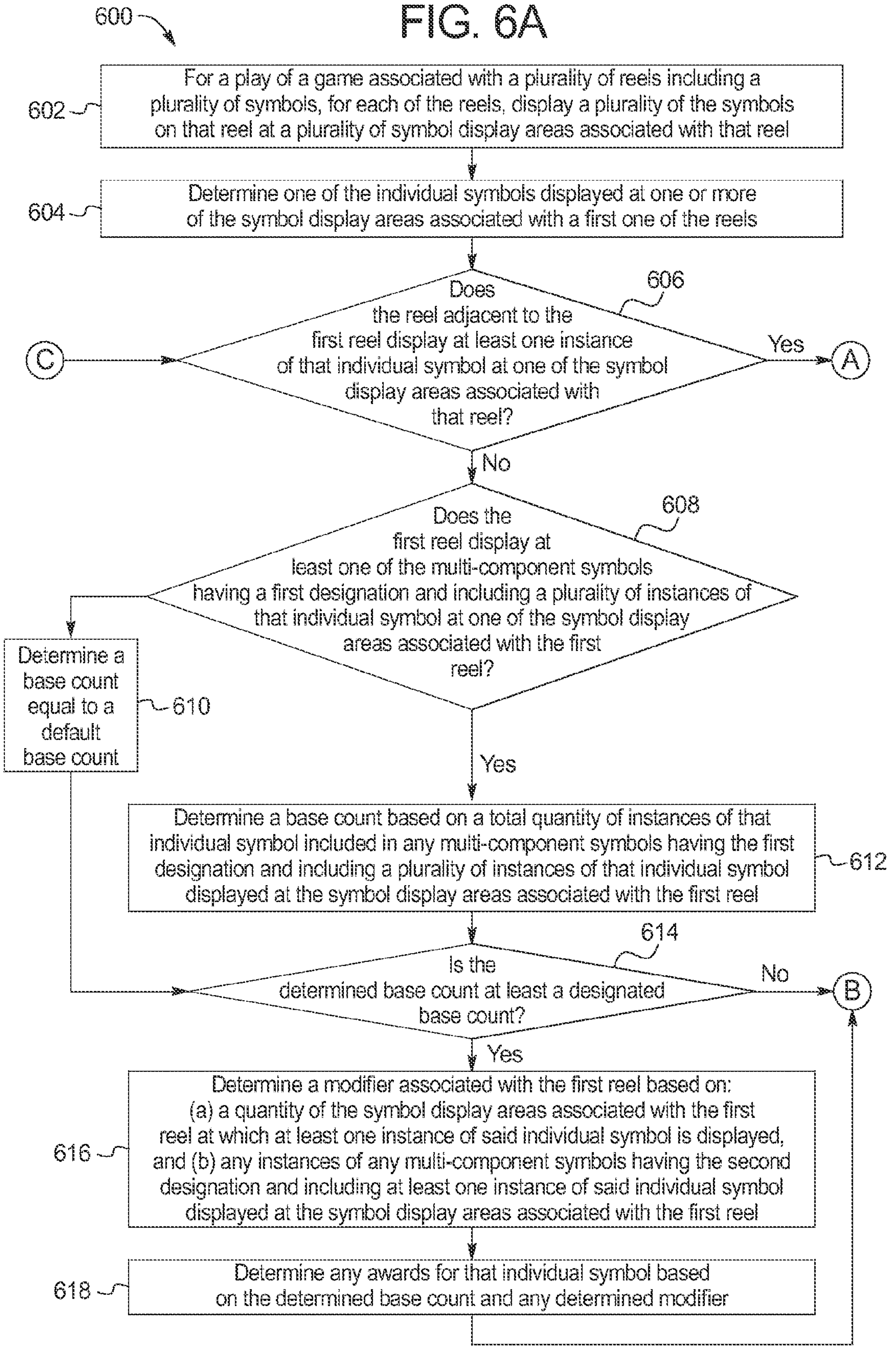
FIGS. 6A and 6B are a flowchart illustrating a method of operating an example embodiment of the gaming system of the present disclosure configured to provide multiway evaluation for a game in which one or more displayed multi-component symbols are utilized to: (a) determine one or more modifiers that are employed to determine one or more awards, (b) determine a base count that is employed to determine one or more awards, or (c) determine one or more modifiers that are employed to determine one or more awards and determine a base count that is employed to determine one or more awards.
Figure 6B:
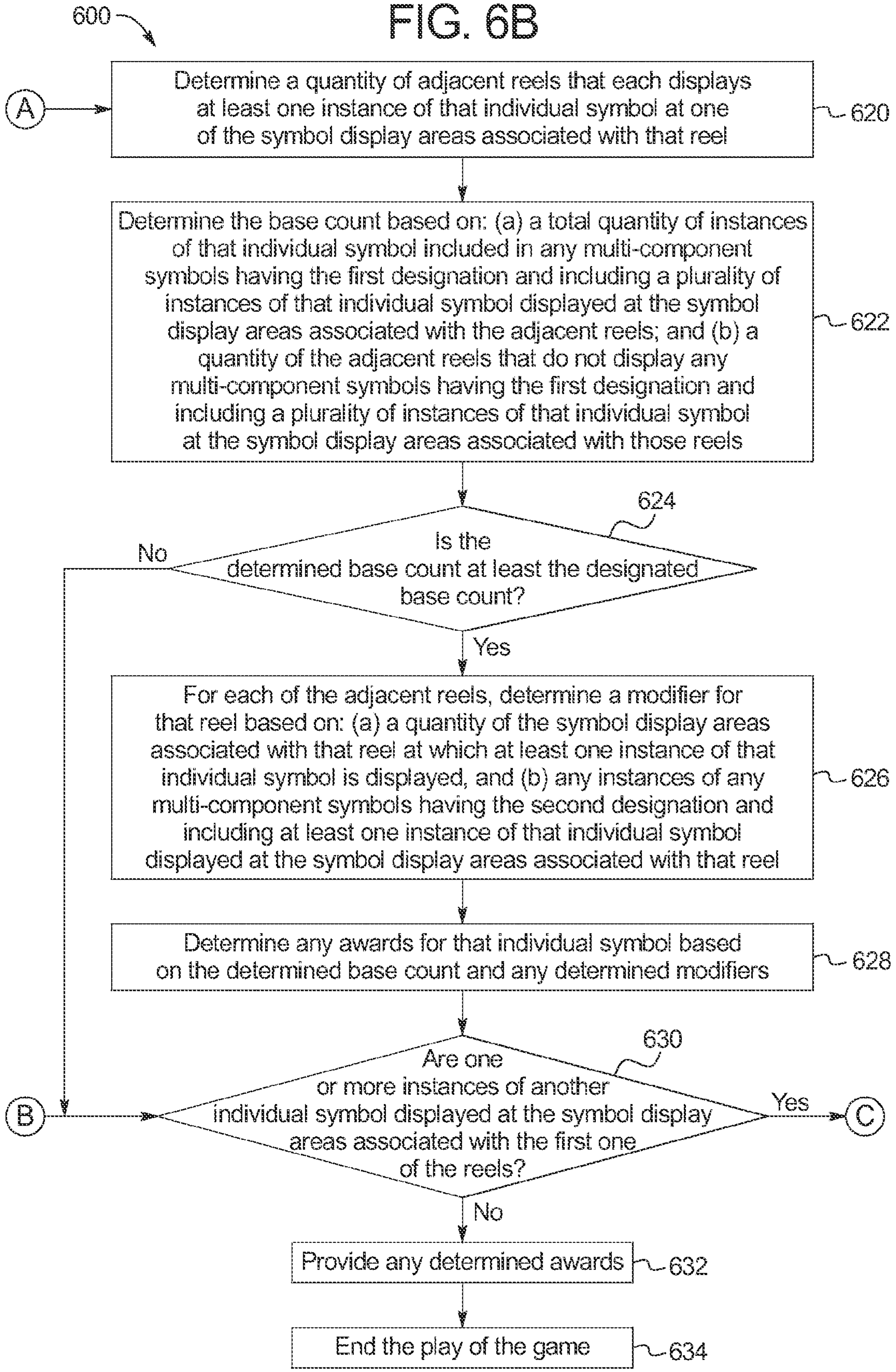

FIGS. 6A and 6B illustrate a flowchart of a process or method 600 for operating an example embodiment of the gaming system of the present disclosure. In various embodiments, process 600 is represented by a set of instructions stored in one or more memories and executed by one or more processors. Although process 600 is described with reference to the flowchart shown in FIGS. 6A and 8B, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In this example, the gaming system is configured to operate a game associated with a plurality of reels including a plurality of symbols. The symbols include a plurality of individual symbols and one or more multi-component symbols. Each of the multi-component symbols includes a plurality of instances of one or more of the individual symbols and has at least one of a first designation and a second designation. The game is also associated with a plurality of symbol display areas. Each of the reels is associated with a plurality of the symbol display areas. For a play of the game, for each of the reels, the gaming system displays a plurality of the symbols on that reel at the symbol display areas associated with that reel, as indicated by block 602. The gaming system determines one of the individual symbols displayed at one or more of the symbol display areas associated with a first one of the reels, as indicated by block 604. The gaming system determines whether the reel adjacent to the first reel displays at least one instance of that individual symbol at one of the symbol display areas associated with that reel, as indicated by diamond 606.

If the reel adjacent to the first reel does not display at least one instance of that individual symbol at one of the symbol display areas associated with that reel, the gaming system determines whether the first reel displays at least one of the multi-component symbols having the first designation and including a plurality of instances of that individual symbol at one of the symbol display areas associated with the first reel, as indicated by diamond 608. If the first reel displays at least one of the multi-component symbols having the first designation and including a plurality of instances of that individual symbol at one of the symbol display areas associated with the first reel, the gaming system determines a base count based on a total quantity of instances of that individual symbol included in any multi-component symbols having the first designation and including a plurality of instances of that individual symbol displayed at the symbol display areas associated with the first reel, as indicated by block 612. If not, the gaming system determines to set the base count equal to a default base count, as indicated by block 610.

The gaming system determines whether the determined base count is at least a designated base count, as indicated by diamond 614. If the determined base count is not at least the designated base count, process 600 proceeds to diamond 630, described below, if the determined base count is at least the designated base count, the gaming system determines a modifier for the first reel based on: (a) a quantity of the symbol display areas associated with the first reel at which at least one instance of that individual symbol is displayed, and (b) any instances of any multi-component symbols having the second designation and including at least one instance of that individual symbol displayed at the symbol display areas associated with the first reel, as indicated by block 618. The gaming system determines any awards for that individual symbol based on the determined base count and any determined modifier, as indicated by block 618. Process 600 proceeds to diamond 630, described below.

Returning to diamond 606, if the reel adjacent to the first reel displays at least one instance of that individual symbol at one of the symbol display areas associated with that reel, the gaming system determines a quantity of adjacent reels that each displays at least one instance of that individual symbol at one of the symbol display areas associated with that reel, as indicated by block 620. The gaming system determines the base count based on: (a) a total quantity of instances of that individual symbol included in any multi-component symbols having the first designation and including a plurality of instances of that individual symbol displayed at the symbol display areas associated with the adjacent reels: and (b) a quantity of the adjacent reels that do not display any multi-component symbols having the first designation and including a plurality of instances of that individual symbol at the symbol display areas associated with those reels, as indicated by block 622.

The gaming system determines whether the determined base count is at least a designated base count, as indicated by diamond 624. If the determined base count is not at least the designated base count, process 600 proceeds to diamond 630, described below. If the determined base count is at least the designated base count, the gaming system determines, for each of the adjacent reels, a modifier for that reel based on: (a) a quantity of the symbol display areas associated with that reel at which at least one instance of that individual symbol is displayed, and (b) any instances of any multi-component symbol having the second designation and including at least one instance of that individual symbol displayed at the symbol display areas associated with that reel, as indicated by block 626. The gaming system determines any awards for that individual symbol based on the determined base count and any determined modifiers, as indicated by block 628.

The gaming system determines whether one or more instances of another individual symbol are displayed at the symbol display areas associated with the first reel, as indicated by diamond 630. If one or more instances of another individual symbol are displayed at the symbol display areas associated with the first reel, process 600 returns to diamond 606. If one or more instances of another individual symbol are not displayed at the symbol display areas associated with the first reel, the gaming system provides any determined awards, as indicated by block 632, and ends the play of the game, as indicated by block 634.

Figure 7:
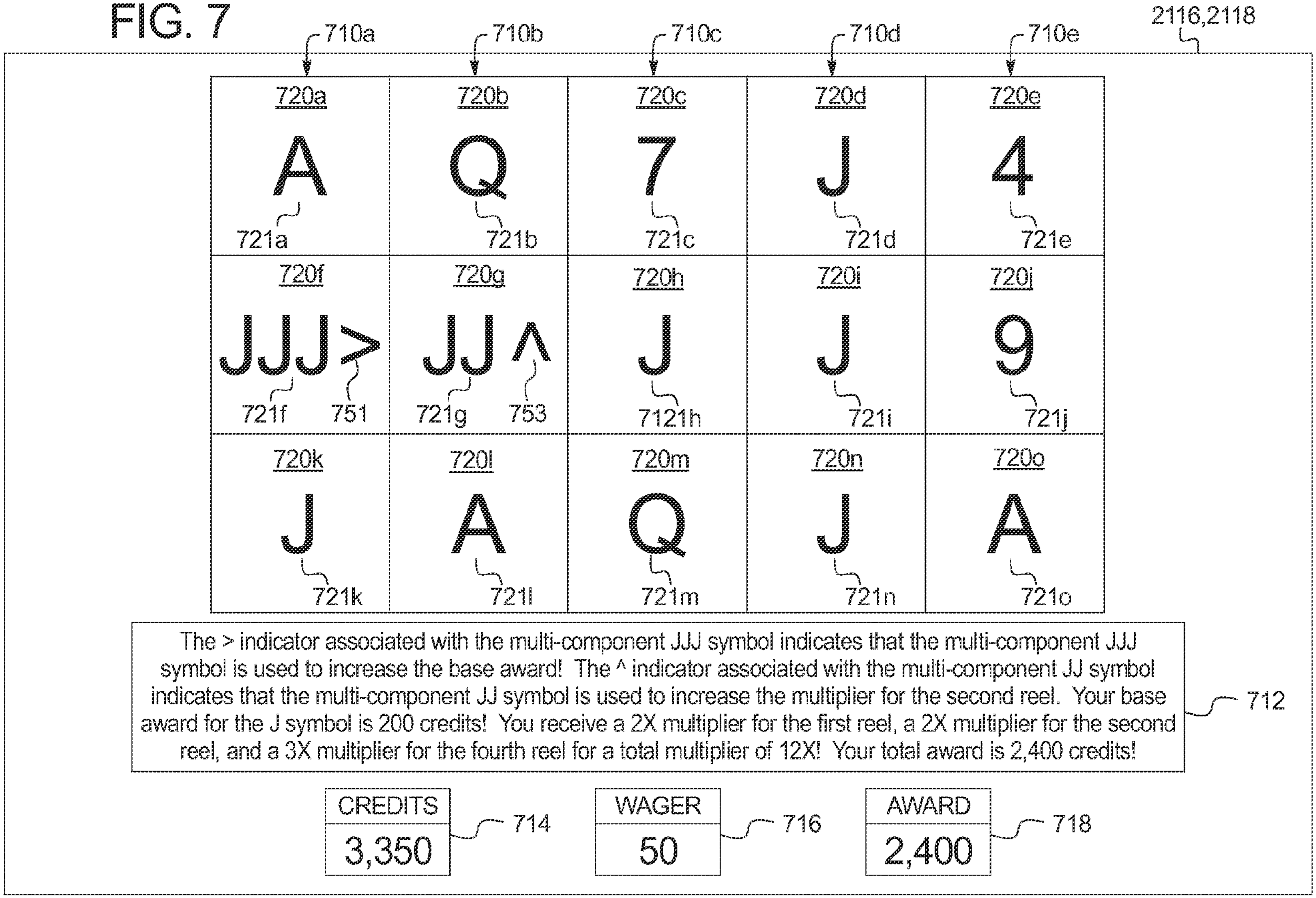
FIG. 7 illustrates a screen shot of an example embodiment of the gaming system of the present disclosure configured to provide multiway evaluation for a game in which one or more displayed multi-component symbols are utilized to: (a) determine one or more modifiers that are employed to determine one or more awards, (b) determine a base count that is employed to determine one or more awards, or (c) determine one or more modifiers that are employed to determine one or more awards and determine a base count that is employed to determine one or more awards.

FIG. 7 illustrates a screen shot of an example embodiment of the gaming system of the present disclosure. In this example, the gaming system is configured to operate the primary slot-type wagering game described above with respect to FIG. 2. In this example, each of the multi-component symbols has or is associated with a first designation, a second designation, or the first designation and the second designation.

In this example, the gaming system utilizes a displayed multi-component symbol having the first designation to determine (at least in part) one or more modifiers that are employed to determine one or more awards, utilizes a displayed multi-component symbol having the second designation to determine (at least in part) a base count that is employed to determine one or more awards, and utilizes a displayed multi-component symbol having both the first designation and the second designation to determine (at least in part) one or more modifiers and (at least in part) a base count that are employed to determine one or more awards.

In this example, the gaming system displays an indicator in association with any displayed instance of a multi-component symbol that identifies which designation(s) is associated with that displayed instance of that multi-component symbol. It should be appreciated that, in other embodiments, the gaming system does not display such an indicator. In this example, the gaming system displays a horizontally pointing arrowhead to indicate that a displayed instance of a multi-component symbol has the first designation, and a vertically pointing arrowhead to indicate that a displayed instance of a multi-component symbol has the second designation. It should be appreciated that the gaming system may employ any suitable indicator.

As illustrated in FIG. 7, upon initiation of a play of the primary wagering game for the maximum wager of 50 credits in this example, the gaming system determined and displayed an outcome for the play of the primary wagering game by, for each of the reels, spinning that reel and displaying a plurality of the symbols on that reel at the symbol display areas associated with that reel. Specifically, the gaming system:

(a) spun reel 710*a* and displayed: an instance 721*a* of the individual A symbol at symbol display area 720*a*; an instance 721*f* of the multi-component JJJ symbol, which includes three instances of the individual J symbol, at symbol display area 720*f*; and an instance 721*k* of the individual j symbol at symbol display area 720*k;*

(b) spun reel 710*b* and displayed: an instance 721*b* of the individual Q symbol at symbol display area 720*b*; an instance 721*g* of the multi-component JJ symbol, which includes two instances of the individual J symbol, at symbol display area 720*g*; and an instance 721*l* of the individual A symbol at symbol display area 720*l;*

(c) spun reel 710*c* and displayed: an instance 721*c* of the individual 7 symbol symbol at symbol display area 720*c*, an instance 721*h* of the individual J symbol at symbol display area 720*h*, and an instance of the individual Q symbol at symbol display area 721*m;*

(d) spun reel 710*d* and displayed: an instance 721*d* of the individual J symbol at symbol display area 720*d*, an instance 721*i* of the individual J symbol at symbol display area 720*b*, and an instance 721*m* of the individual j symbol at symbol display area 720*m*; and (e) spun reel 710*e* and displayed: an instance 721*e* of the individual 4 symbol at symbol display area 720*e*; an instance 721*j* of the individual 9 symbol at symbol display area 720*j*, and an instance 721*o* of the individual A symbol at symbol display area 720*o*.

As shown in FIG. 7, the gaming system displayed an indicator 751 in association with instance 721*f* of the multi-component JJJ symbol, which indicated that instance 721*f* of the multi-component JJJ symbol had the first designation. Additionally, the gaming system displayed an indicator 753 in association with instance 721*g* of the multi-component JJ symbol, which indicated that instance 721*g* of the multi-component JJ symbol had the second designation.

Generally, for a play of the primary wagering game in this example, the gaming system makes an award determination associated with each individual symbol displayed at one or more of the symbol display areas associated with a first one of the reels. More specifically, for a first individual symbol displayed at one or more of the symbol display areas associated with the first reel, The gaming system determines whether the reel adjacent to the first reel displays at least one instance of the first individual symbol at one of the symbol display areas associated with that reel.

If the reel adjacent to the first reel does not display at least one instance of the first individual symbol at one of the symbol display areas associated with that reel, the gaming system determines whether the first reel displays at least one of the multi-component symbols having the first designation and including a plurality of instances of the first individual symbol at one of the symbol display areas associated with the first reel, if the first reel displays at least one of the multi-component symbols having the first designation and including a plurality of instances of the first individual symbol at one of the symbol display areas associated with the first reel, the gaming system determines a base count based on a total quantity of instances of the first individual symbol included in any multi-component symbols having the first designation and including a plurality of instances of the first individual symbol displayed at the symbol display areas associated with the first reel. If not, the gaming system determines to set the base count equal to a default base count.

The gaming system determines whether the determined base count is at least a designated base count. If the determined base count is not at least the designated base count, the gaming system ends the award determination process with respect to the first individual symbol, and repeats the award determination process for each additional individual symbol displayed at one or more of the symbol display areas associated with the first reel (if any). If the determined base count is at least the designated base count, the gaming system determines a modifier for the first reel based on: (a) a quantity of the symbol display areas associated with the first reel at which at least one instance of the first individual symbol is displayed, and (b) any instances of any multi-component symbol having the second designation and including at least one instance of the first individual symbol displayed at the symbol display areas associated with the first reel. The gaming system determines any awards for that individual symbol based on the determined base count and any determined modifier. The gaming system ends the award determination process with respect to the first individual symbol, and repeats the award determination process for each additional individual symbol displayed at one or more of the symbol display areas associated with the first reel (if any).

If, on the other hand, the reel adjacent to the first reel displays at least one instance of the first individual symbol at one of the symbol display areas associated with that reel, the gaming system determines a quantity of adjacent reels that each displays at least one instance of the first individual symbol at one of the symbol display areas associated with that reel. In this instance, the gaming system determines the base count based on: (a) a total quantity of instances of the first individual symbol included in any multi-component symbols having the first designation and including a plurality of instances of the first individual symbol displayed at the symbol display areas associated with the adjacent reels; and (b) a quantity of the adjacent reels that do not display any multi-component symbols having the first designation and including a plurality of instances of the first individual symbol at the symbol display areas associated with those reels.

The gaming system determines whether the determined base count is at least the designated base count. If the determined base count is not at least the designated base count, the gaming system ends the award determination process with respect to the first individual symbol, and repeats the award determination process for each additional individual symbol displayed at one or more of the symbol display areas associated with the first reel (if any). If the determined base count is at least the designated base count, the gaming system determines, for each of the adjacent reels, a modifier for that reel based on: (a) a quantity of the symbol display areas associated with that reel at which at least one instance of the first individual symbol is displayed, and (b) any instances of any multi-component symbol having the second designation and including at least one instance of the first individual symbol displayed at the symbol display areas associated with that reel. The gaming system determines any awards for that individual symbol based on the determined base count and any determined modifiers. The gaming system ends the award determination process with respect to the first individual symbol, and repeats the award determination process for each additional individual symbol displayed at one or more of the symbol display areas associated with the first reel (if any). The gaming system provides any determined awards.

In this example, the first reel is the leftmost reel, the designated base count is three, and the default base count is one. Thus, in this example, the gaming system makes an award determination for each individual symbol displayed at one or more of the symbol display areas associated with the leftmost reel.

Additionally, in this example, if: (a) the reel displayed immediately to the right of the leftmost reel (i.e., the reel adjacent to the leftmost reel) does not display at least one instance of the first individual symbol at one of the symbol display areas associated with that reel, and (b) the leftmost reel does not display at least one multi-component symbol including a plurality of instances of the first individual symbol at one of the symbol display areas associated with the leftmost reel, the gaming system sets the base count equal to the default base count of one.

Further, in this example, if: (a) the reel displayed immediately to the right of the leftmost reel (i.e., the reel adjacent to the leftmost reel) does not display at least one instance of the first individual symbol at one of the symbol display areas associated with that reel, and (b) the leftmost reel displays at least one multi-component symbol having the first designation and including a plurality of instances of the first individual symbol at one of the symbol display areas associated with the leftmost reel, the gaming system sets the base count equal to a total quantity of instances of the first individual symbol included in any multi-component symbols having the first designation and including a plurality of instances of the first individual symbol displayed at the symbol display areas associated with the leftmost reel.

Additionally, in this example, if the reel displayed immediately to the right of the leftmost reel (i.e., the reel adjacent to the leftmost reel) displays at least one instance of the first individual symbol at one of the symbol display areas associated with that reel, the gaming system determines a quantity of adjacent reels that each displays at least one instance of the first individual symbol at the symbol display areas associated with that reel, and sets the base count equal to a sum of: (a) a total quantity of instances of the first individual symbol included in any multi-component symbols having the first designation and including a plurality of instances of the first individual symbol displayed at the symbol display areas associated with the adjacent reels; and (b) a quantity of the adjacent reels that do not display any multi-component symbols having the first designation and including a plurality of instances of the first individual symbol at the symbol display areas associated with those reels.

In this example, any determined modifier associated with a given reel includes a multiplier having a multiplier value. In this example, for the first individual symbol, the multiplier value of a multiplier for that reel is equal to a sum of: (a) a total quantity of the instances of the first individual symbol included in any multi-component symbols having the second designation and including at least one instance of the first individual symbol displayed at the symbol display areas associated with that reel, and (b) a quantity of the symbol display areas associated with that reel at which at least one instance of the first individual symbol other than any instances of the first individual symbol included in any multi-component symbols having the second designation is displayed.

The gaming system employs each determined multiplier to determine a total award for the first individual symbol. Specifically, in this example, the gaming system determines a base award for the first individual symbol based on: (a) the first individual symbol, and (b) the determined base count. The gaming system determines the total award for the first individual symbol by multiplying the determined base award by each of the determined multipliers.

Returning to FIG. 7, in this example, one instance of the individual A symbol (i.e., instance 721*a*) was displayed at one of the symbol display areas (i.e., symbol display area 720*a*) associated with the leftmost reel (i.e., reel 710*a*). Additionally, a plurality of instances of the individual J symbol (i.e., the three instances included in instance 721*f* of the multi-component JJJ symbol and instance 721*k*) were displayed at the symbol display areas (i.e., symbol display areas 720*f* and 720*k*) associated with the leftmost reel (i.e., reel 710*a*). Thus, the gaming system made an award determination for each of the individual A symbol and the individual J symbol.

Turning to the individual A symbol, the gaming system evaluated reel 710*b* (i.e., the reel immediately to the right of leftmost reel 710*a*) and determined that reel 710*b* displayed instance 721*l* of the individual A symbol at symbol display area 720*l* associated with reel 710*b*. Accordingly, the gaming system evaluated the reels from left to right and determined that two adjacent reels (including the leftmost reel) each displayed at least one instance of the individual A symbol at the symbol display areas associated with that reel. Specifically, the gaming system determined that: (a) leftmost reel 710*a* displayed instance 721*a* of the individual A symbol at symbol display area 720*a* associated with reel 710*a*: and (b) reel 710*b*, which was displayed immediately to the right of reel 710*a*, displayed instance 721*l* of the individual A symbol at symbol display area 720*l* associated with reel 710*b*.

Since reel 710*b* displayed immediately to the right of reel 710*a* displayed at least one instance of the individual A symbol at one of the symbol display areas associated with that reel, the gaming system set the base count equal to a sum of: (a) a total quantity of instances of the individual A symbol included in any multi-component symbol having the first designation and including a plurality of instances of the individual A symbol displayed at the symbol display areas associated with reels 710*a* and 710*b*; and (b) a quantity of reels 710*a* and 710*b* that did not display any multi-component symbols having the first designation and including a plurality of instances of the individual A symbol at the symbol display areas associated with those reels.

In this example, neither of reels 710*a* and 710*b* displayed a multi-component symbol having the first designation and including a plurality of instances of the individual A symbol at the symbol display areas associated with those reels. Accordingly, the gaming system set the base count equal to two (i.e., a quantity of reels 710*a* and 710*b* that did not display one of the multi-component symbols having the first designation and including a plurality of instances of the individual A symbol at the symbol display areas associated with those reels). Since the determined base count of two is not at least equal to the designated base count of three, the gaming system determined not to determine or provide any awards for the individual A symbol.

Turning to the individual J symbol, the gaming system evaluated reel 710*b* (i.e., the reel immediately to the right of leftmost reel 710*a*) and determined that reel 710*b* displayed the two instances of the individual J symbol included in instance 721*g* of the multi-component JJ symbol displayed at symbol display area 720*g* associated with reel 710*b*. Accordingly, the gaming system evaluated the reels from left to right and determined that four adjacent reels including the leftmost reel each displayed at least one instance of the individual J symbol at the symbol display areas associated with that reel. Specifically, the gaming system determined that: (a) leftmost reel 710*a* displayed the three instances of the individual J symbol included in instance 721*f* of the multi-component JJJ symbol displayed at symbol display area 720*f* associated with reel 710*a*, and displayed instance 721*k* of the individual J symbol at symbol display area 720*k* associated with reel 710*a*; (b) reel 710*b*, which was displayed immediately to the right of reel 710*a*, displayed the two instances of the individual J symbol included in instance 721*g* of the multi-component JJ symbol displayed at symbol display area 720*g* associated with reel 710*b*; (c) reel 710*c*, which was displayed immediately to the right of reel 710*b*, displayed instance 721*h* of the individual J symbol at symbol display area 720*h* associated with reel 710*c*; and (d) reel 710*d*, which was displayed immediately to the right of reel 710*c*, displayed instance 721*d* of the individual J symbol at symbol display area 720*d* associated with reel 710*d*, instance 721*i* of the individual J symbol at symbol display area 720*i* associated with reel 710*d*, and instance 721*n* of the individual J symbol at symbol display area 720*n* associated with reel 710*d*.

Since reel 710*b* displayed immediately to the right of reel 710*a* displayed at least one instance of the individual J symbol at one of the symbol display areas associated with that reel, the gaming system set the base count equal to a sum of: (a) a total quantity of instances of the individual J symbol included in any multi-component symbols having the first designation and including a plurality of instances of the individual J symbol displayed at the symbol display areas associated with reels 710*a*, 710*b*, 710*c*, and 710*d*; and (b) a quantity of reels 710*a*, 710*b*, 710*c*, and 710*d* that did not display any multi-component symbols having the first designation and including a plurality of instances of the individual J symbol at the symbol display areas associated with those reels.

In this example, reel 710*a* displayed a multi-component symbol having the first designation and including a plurality of instances of the individual J symbol at the symbol display areas associated with that reel. Specifically, reel 710*a* displayed instance 721*f* of the multi-component JJJ symbol, which has the first designation and includes three instances of the individual J symbol. The gaming system also determined a quantity of three of reels 710*a*, 710*b*, 710*c*, and 710*d* that did not display one of the multi-component symbols having the first designation and including a plurality of instances of the individual J symbol at the symbol display areas associated with those reels (i.e., reels 710*b*, 710*c*, and 710*d*).

Accordingly, the gaming system set the base count equal to six. The gaming system determined that the determined base count of six was at least equal to and, in this instance greater than, than the designated base count of three. Accordingly, the gaming system determined multipliers for the four adjacent reels for use in determining a total award for the individual J symbol.

With respect to reel 710*a*: (a) none of the symbol display areas associated with reel 710*a* displayed any instances of any multi-component symbols having the second designation and including at least one instance of the individual J symbol, and (b) two of the symbol display areas associated with reel 710*a* displayed at least one instance of the individual J symbol other than any instances of the individual J symbol included in any multi-component symbols having the second designation. Therefore, the gaming system determined a multiplier having a multiplier value of 2× for reel 710*a*.

With respect to reel 710*b*: (a) a total quantity of two instances of the individual J symbol were included in instance 721*g* of the multi-component JJ symbol having the second designation and displayed at symbol display area 720*g* associated with reel 710*b*, and (b) none of the symbol display areas associated with reel 710*b* displayed at least one instance of the individual J symbol other than any instances of the individual J symbol included in any multi-component symbols having the second designation. Therefore, the gaming system determined a multiplier having a multiplier value of 2× for reel 710*b*.

With respect to reel 710*c*: (a) none of the symbol display areas associated with reel 710*c* displayed any instances of any multi-component symbols having the second designation and including at least one instance of the individual J symbol, and (b) one of the symbol display areas associated with reel 710*b* displayed at least one instance of the individual J symbol other than any instances of the individual J symbol included in any multi-component symbols having the second designation. Therefore, the gaming system determined a multiplier having a multiplier value of 1× for reel 710*c*.

With respect to reel 710*d*: (a) none of the symbol display areas associated with reel 710*d* displayed any instances of any multi-component symbols having the second designation and including at least one instance of the individual J symbol, and (b) three of the symbol display areas associated with reel 710*d* displayed at least one instance of the individual J symbol other than any instances of the individual J symbol included in any multi-component symbols having the second designation. Therefore, the gaming system determined a multiplier having a multiplier value of 3× for reel 710*d*.

In this example, the gaming system determined a base award of 200 credits based on: (a) the individual J symbol, and (b) the determined base count of six. To determine the total award for the individual J symbol, the gaming system multiplied the determined base award of 200 credits by the determined multipliers having multiplier values of 2×, 2×, 1×, and 3×, resulting in a total award of 2,400 credits for the individual J symbol. The gaming system displayed the award of 2,400 credits at award meter 718, and updated the player's credit balance in credit meter 714 to reflect the 2,400 credit award.

In certain such embodiments, the gaming system displays any indicators after displaying one or more instances of any multi-component symbols. In one embodiment, the gaming system spins the reels and displays a plurality of the symbols on the reels at the symbol display areas. The gaming system determines whether any instances of any multi-component symbols were displayed. If an instance of a multi-component symbol was displayed, the gaming system displays an indicator in association with that displayed instance of that multi-component symbol indicating whether that displayed multi-component symbol has the first designation, the second designation, or both, in one example, the gaming system displays an arrow head spinning and stopping in one of the horizontal and the vertical orientations which, as described above, identify the designation(s) with which that multi-component symbol is associated.

It should be appreciated that the designation(s) of a multi-component symbol may be: (a) randomly determined, (b) predetermined, (c) determined by a player, (d) determined based on a player tracking level, (e) determined based on game play, or (f) determined in any other suitable manner or based on any suitable factor, in one example, a player accumulates designations through game play, such as by achieving one or more designated outcomes, and the gaming system employs accumulated designations, in one instance, if the player has not accumulated any designations, the gaming system does not employ any designations (i.e., gaming system disables that feature). In another example in which the gaming system provides a multiway slot game, designations accumulated through play of one of the slot games apply to at least one additional one of the slot games.

In one embodiment, the plurality of symbols includes one or more reduction symbols that cause the gaming system to reduce the base count when they are displayed at one or more of the symbol display areas associated with one or more of the reels. In another embodiment, the plurality of symbols includes one or more reduction symbols that cause the gaming system to reduce the multiplier value of a multiplier for a given reel when they are displayed at one or more of the symbol display areas associated with that reel.

In another embodiment, the gaming system includes a plurality of different reel sets. Each of the different reel sets includes a different quantity of multi-component symbols, in this embodiment, the gaming system determines which of the reel sets to employ for a play of the game based on the player's wager for that play of the game. Specifically, the higher the players wager, the better the reel set employed by the gaming system. Put differently, the gaming system employs reel sets including relatively higher quantities of multi-component symbols when the player places relatively higher wagers. For example, the gaming system employs the reel set having the highest quantity of multi-component symbols (i.e., the most favorable reel set) when the player places the maximum wager, and the reel set having the lowest quantity of multi-component symbols (i.e., the least favorable reel set) when the player places the minimum wager.

In one embodiment, the gaming system does not employ different modifiers to determine any total awards for each separate individual symbol displayed at one or more of the symbol display areas associated with the first reel. Instead, in this embodiment, the gaming system: (a) determines the modifiers for each of the individual symbols for each of the reels, (b) determines the highest of the modifiers for each of the reels, and (c) applies the highest modifier for each of the reels when determining the total awards for each of the individual symbols. For example, if the modifiers associated with an individual A symbol for three reels are 4×, 1×, and 2×, respectively, and the modifiers associated with an individual Q symbol are 1×, 3×, and 3×, respectively, the gaming system employs the following modifiers when determining the total awards for both the individual A and Q symbols: 4×, 3×, and 3×.

In another embodiment, each reel (or, in another embodiment, each row of symbol display areas) is associated with a base modifier. In one example, the base modifier increases from left to right (such as 1×, 2×, 3×, 4×, and 5×). In this embodiment, for a given reel, the gaming system multiplies any modifier determined for that reel by the base modifier associated with that reel to determine a total modifier, which is then used to determine any total award. Continuing with the above example, if the gaming system determines modifiers for the reels for the individual A symbol of 3×, 1×, 2×, 3×, and 2× from left to right, the gaming system determines total modifiers for each of the reels of 3×, 2×, 6×, 12×, and 10×. It should be appreciated that, in other embodiments, the base modifiers are randomly determined.

In one embodiment in which one of the designations is associated with a displayed multi-component symbol including at least one instance of each of at least two different symbols, the gaming system employs the designation separately for both of the different symbols. For instance, if the multi-component symbol is KKJJ, the gaming system employs the designation for the KK portion and the JJ portion separately. In another such embodiment, the gaming system employs the designation once, for one of the symbols. For instance, if the multi-component symbol is KKJ, the gaming system employs the designation for either the KK portion or the J portion. In one such embodiment, the gaming system employs the designation for whichever symbol would most benefit the player. In another such embodiment, the gaming system enables the player to choose the symbol for which the gaming system will employ the designation.

While the above examples are described with respect to multiway evaluation, it should be appreciated that the present disclosure contemplates including such multi-component symbols in payline or scatter-based spinning reel-type games.

Figure 8:
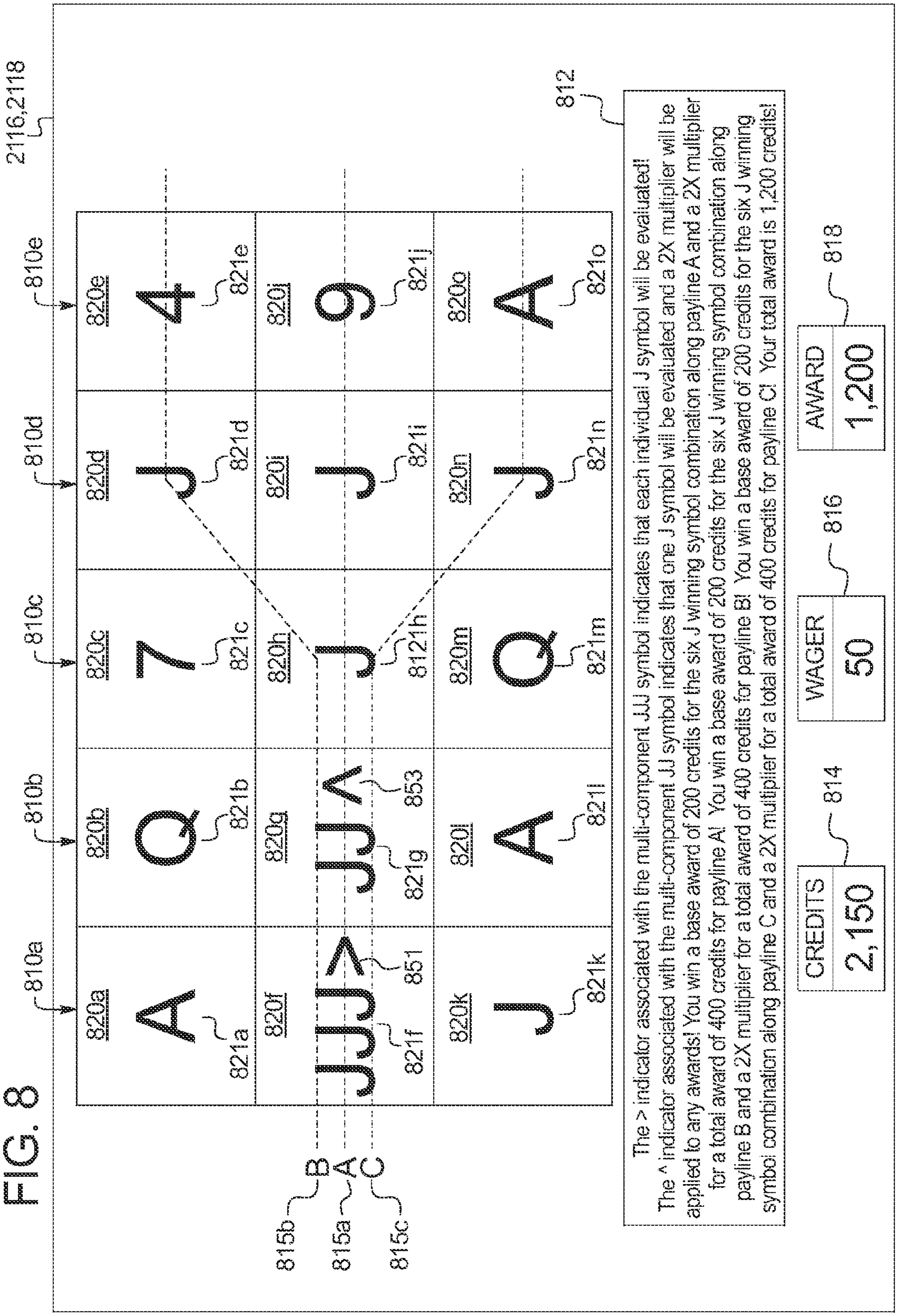
FIG. 8 illustrates a screen shot of an example embodiment of the gaming system of the present disclosure configured to operate a payline-based spinning-reel type game in which one or more displayed multi-component symbols are utilized to: (a) determine one or more modifiers that are employed to determine one or more awards, (b) determine whether a winning symbol combination is employed along a payline, or (c) determine one or more modifiers that are employed to determine one or more awards and determine whether a winning symbol combination is employed along a payline.

FIG. 8 illustrates a screen shot of an example embodiment of the gaming system of the present disclosure. In this example, the gaming system is configured to operate a primary slot-type wagering game associated with a plurality of reels 810*a*, 810*b*, 810*c*, 810*d*, and 810*e* including a plurality of symbols. In this example, the symbols include a plurality of individual symbols and a plurality of multi-component symbols. Additionally, in this example, each of the multi-component symbols includes a plurality of instances of one or more of the individual symbols. Further, in this example, each of the multi-component symbols has or is associated with a first designation, a second designation, or the first designation and the second designation.

In this embodiment, the gaming system utilizes a displayed multi-component symbol having the first designation to determine (at least in part) one or more modifiers that are employed to determine one or more awards, utilizes a displayed multi-component symbol having the second designation to determine (at least in part) a base count that is employed to determine one or more awards, and utilizes a displayed multi-component symbol having both the first designation and the second designation to determine (at least in part) one or more modifiers and (at least in part) a base count that are employed to determine one or more awards.

In this example, the gaming system displays an indicator in association with any displayed instance of a multi-component symbol that identifies which designation(s) is associated with that displayed instance of that multi-component symbol. It should be appreciated that, in other embodiments, the gaming system does not display such an indicator, in this example, the gaming system displays a horizontally pointing arrowhead to indicate that a displayed instance of a multi-component symbol has the first designation, and a vertically pointing arrowhead to indicate that a displayed instance of a multi-component symbol has the second designation. It should be appreciated that the gaming system may employ any suitable indicator.

The primary wagering game is associated with, and the gaming system displays (such as on display device 2116 or 2118 described below), a plurality of symbol display areas 820*a*, 820*b*, 820*c*, 820*d*, 820*e*, 820*f*, 820*g*, 820*h*, 820*i*, 820*j*, 820*k*, 820*l*, 820*m*, 820*n*, and 820*o* arranged in a 3×5 matrix. Each of the reels is associated with a plurality of the symbol display areas. Specifically, in this example: reel 810*a* is associated with symbol display areas 820*a*, 820*f*, and 820*k*; reel 810*b* is associated with symbol display areas 820*b*, 820*g*, and 820*l*; reel 810*c* is associated with symbol display areas 820*c*, 820*h*, and 820*m*; reel 810*d* is associated with symbol display areas 820*d*, 820*i*, and 820*n*; and reel 810*e* is associated with symbol display areas 820*e*, 820*j*, and 820*o*. For each of the reels, the symbols on that reel are displayable at the symbol display areas associated with that reel.

The game is also associated with a plurality of paylines A 815*a*, B 815*b*, and C 815*c*. Each of the paylines is associated with a different plurality of the symbol display areas. Specifically, payline A 815*a* is associated with symbol display areas 820*f*, 820*g*, 820*h*, 820*i*, and 820*j*; payline B 815*b* is associated with symbol display areas 820*f*, 820*g*, 820*h*, 820*d*, and 820*e*; and payline C 815*c* is associated with symbol display areas 820*f*, 820*g*, 820*h*, 820*n*, and 820*o*. Payline A 815*a*, payline B 815*b*, and payline C 815*c* are sometimes referred to herein as paylines A, B, and C. It should be appreciated that any suitable quantity of paylines associated with any suitable combination of symbol display areas may be employed.

In this example, the gaming system employs a paytable (not shown) for the primary wagering game that includes a plurality of winning symbol combinations and the credit payout associated with each respective winning symbol combination. Specifically, in this example, the paytable includes a credit payout associated with each respective winning symbol combination when the maximum wager, which is 50 credits in this example (but could be any suitable amount), is placed for a play of the primary wagering game.

Additionally, in this example, the gaming system displays: a message display area 812, which displays information, notifications, and/or messages before, during, or after play of the primary wagering game; a credit meter 814, which displays a player's credit balance in the form of an amount of credits: a wager indicator 818, which displays the player's wager for a play of the primary wagering game in the form of an amount of credits; and an award meter 818, which displays any awards provided to the player in the form of an amount of credits. While in this illustrated example the gaming system indicates the player's credit balance, the player's wager, and any awards provided to the player in the form of amounts of credits, it should be appreciated that such indications may alternatively or additionally be made in the form of amounts of currency.

As illustrated in FIG. 8, upon initiation of a play of the primary wagering game for the maximum wager of 50 credits in this example, the gaming system determined and displayed an outcome for the play of the primary wagering game by, for each of the reels, spinning that reel and displaying a plurality of the symbols on that reel at the symbol display areas associated with that reel. Specifically, the gaming system:

(a) spun reel 810*a* and displayed: an instance 821*a* of the individual A symbol at symbol display area 820*a*: an instance 821*f* of the multi-component JJJ symbol, which includes three instances of the individual J symbol, at symbol display area 820*f*; and an instance 821*k* of the individual J symbol at symbol display area 820*k;*

(b) spun reel 810*b* and displayed: an instance 821*b* of the individual Q symbol at symbol display area 820*b*; an instance 821*g* of the multi-component JJ symbol, which includes two instances of the individual J symbol, at symbol display area 820*g*; and an instance 821*l* of the individual A symbol at symbol display area 820*l:*

(c) spun reel 810*c* and displayed: an instance 821*c* of the individual 7 symbol symbol at symbol display area 820*c*, an instance 821*h* of the individual J symbol at symbol display area 820*h*, and an instance of the individual Q symbol at symbol display area 821*m;*

(d) spun reel 810*d* and displayed: an instance 821*d* of the individual J symbol at symbol display area 820*d*, an instance 821*i* of the individual J symbol at symbol display area 820*i*, and an instance 821*m* of the individual J symbol at symbol display area 820*m*; and (e) spun reel 810*e* and displayed: an instance 821*e* of the individual 4 symbol at symbol display area 820*e*; an instance 821*j* of the individual 9 symbol at symbol display area 820*j*, and an instance 821*o* of the individual A symbol at symbol display area 820*o*.

As shown in FIG. 8, the gaming system displayed an indicator 851 in association with instance 821*f* of the multi-component JJJ symbol, which indicated that instance 821*f* of the multi-component JJJ symbol had the first designation. Additionally, the gaming system displayed an indicator 853 in association with instance 821*g* of the multi-component JJ symbol, which indicated that instance 821*g* of the multi-component JJ symbol had the second designation.

Generally, for a play of the primary wagering game in this example, the gaming system makes an award determination associated with each of the paylines. More specifically, the gaming system evaluates the paylines from left to right (or right to left, in other embodiments) and determines whether any of the winning symbol combinations are displayed along the paylines. If so, the gaming system provides the appropriate award associated with that winning symbol combination.

In this example, when an instance of a multi-component symbol having the first designation is displayed along a payline, the gaming system evaluates each instance of each individual symbol included in that multi-component symbol when determining whether any winning symbol combinations are displayed along that payline. For instance, if an instance of the multi-component AAA symbol having the first designation is displayed along a payline, the gaming system evaluates each of the three instances of the individual A symbol included in the multi-component AAA symbol when determining whether any winning symbol combinations are displayed along that payline.

On the other hand, in this example, when an instance of a multi-component symbol having the second designation is displayed along a payline, the gaming system determines a single instance (or, in other embodiments, fewer than all instances) of one of the individual symbols included in that multi-component symbol. The gaming system then evaluates that single instance when determining whether any winning symbol combinations are displayed along that payline. The gaming system also determines a multiplier having a multiplier value equal to a total quantity of instances of any individual symbols included in that multi-component symbol having the second designation. The gaming system applies the multiplier to any award determined for any winning symbol combination displayed along that payline. For instance, if an instance of the multi-component AAA symbol having the first designation is displayed along a payline, the gaming system evaluates one of the three instances of the individual A symbol included in the multi-component AAA symbol when determining whether any winning symbol combinations are displayed along that payline, and determines a 3× multiplier to apply to any award associated with that payline.

Turning to payline A, instance 821*f* of the multi-component JJJ symbol having the first designation, instance 821*g* of the multi-component JJ symbol having the second designation, instance 821*h* of individual J symbol, instance 821*i* of individual J symbol, and instance 821*j* of individual 9 symbol were displayed along payline A. The gaming system determined that a winning symbol combination of six consecutive J symbols is displayed along payline A. Because instance 821*f* of the multi-component JJJ symbol had the first designation, the gaming system evaluated each instance of the J symbol included in instance 821*f* of the multi-component JJJ symbol when evaluating payline A for winning symbol combinations. Because instance 821*g* of the multi-component JJ symbol had the second designation, the gaming system evaluated only one instance of the J symbol included in instance 821*g* of the multi-component JJ symbol when evaluating payline A for winning symbol combinations.

The gaming system determined a multiplier having a multiplier value of 2× based on instance 821*g* of the multi-component JJ symbol including two instances of the individual J symbol displayed along payline A. The gaming system determined a base award of 200 credits for the winning symbol combination, and a total award of 400 credits for payline A by multiplying the determined base award by the determined 2× multiplier.

Turning to payline B, instance 821*f* of the multi-component JJJ symbol having the first designation, instance 821*g* of the multi-component JJ symbol having the second designation, instance 821*h* of individual J symbol, instance 821*d* of individual J symbol, and instance 821*e* of individual 4 symbol were displayed along payline B. The gaming system determined that the winning symbol combination of six consecutive J symbols was displayed along payline B. Because instance 821*f* of the multi-component JJJ symbol had the first designation, the gaming system evaluated each instance of the J symbol included in instance 821*f* of the multi-component JJJ symbol when evaluating payline B for winning symbol combinations. Because instance 821*g* of the multi-component JJ symbol had the second designation, the gaming system evaluated only one instance of the J symbol included in instance 821*g* of the multi-component JJ symbol when evaluating payline B for winning symbol combinations.

The gaming system determined a multiplier having a multiplier value of 2× based on instance 821*g* of the multi-component JJ symbol including two instances of the individual J symbol displayed along payline B. The gaming system determined a base award of 200 credits for the winning symbol combination, and a total award of 400 credits for payline B by multiplying the determined base award by the determined 2× multiplier.

Turning to payline C, instance 821*f* of the multi-component JJJ symbol having the first designation, instance 821*g* of the multi-component JJ symbol having the second designation, instance 821*h* of individual J symbol, instance 821*n* of individual J symbol, and instance 821*o* of individual A symbol were displayed along payline C. The gaming system determined that the winning symbol combination of six consecutive J symbols was displayed along payline C. Because instance 821*f* of the multi-component JJJ symbol had the first designation, the gaming system evaluated each instance of the J symbol included in instance 821*f* of the multi-component JJJ symbol when evaluating payline C for winning symbol combinations. Because instance 821*g* of the multi-component JJ symbol had the second designation, the gaming system evaluated only one instance of the J symbol included in instance 821*g* of the multi-component JJ symbol when evaluating payline C for winning symbol combinations.

The gaming system determined a multiplier having a multiplier value of 2× based on instance 821*g* of the multi-component JJ symbol including two instances of the individual J symbol displayed along payline C. The gaming system determined a base award of 200 credits for the winning symbol combination, and a total award of 400 credits for payline C by multiplying the determined base award by the determined 2× multiplier The gaming system displayed the total 1,200 credit award at credit meter 818, and updated the player's credit balance in credit meter 814 to reflect the 1,200 credit award.

It should be appreciated that any of the embodiments described herein may be employed with independent reels, as described below. It should also be appreciated that any of the embodiments described herein may include paylines in addition to or instead of multiway evaluation.

Gaming Systems

It should be appreciated that the above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics, it should be appreciated that a "gaming system" as used herein refers to various configurations of: (a) one or more central servers, central controllers, or remote hosts; (b) one or more EGMs; and/or (c) one or more personal gaming devices, such as desktop computers, laptop computers, tablet computers or computing devices, personal digital assistants (PDAs), mobile telephones such as smart phones, and other mobile computing devices.

Thus, in various embodiments, the gaming system of the present disclosure includes: (a) one or more EGMs in combination with one or more central servers, central controllers, or remote hosts; (b) one or more personal gaming devices in combination with one or more central servers, central controllers, or remote hosts: (c) one or more personal gaming devices in combination with one or more EGMs; (d) one or more personal gaming devices, one or more EGMs, and one or more central servers, central controllers, or remote hosts in combination with one another; (e) a single EGM; (f) a plurality of EGMs in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity, each EGM and each personal gaming device of the present disclosure is collectively referred to herein as an "EGM." Additionally, for brevity and clarity, unless specifically stated otherwise, "EGM" as used herein represents one EGM or a plurality of EGMs, and "central server, central controller, or remote host" as used herein represents one central server, central controller, or remote host or a plurality of central servers, central controllers, or remote hosts.

Figure 9A:
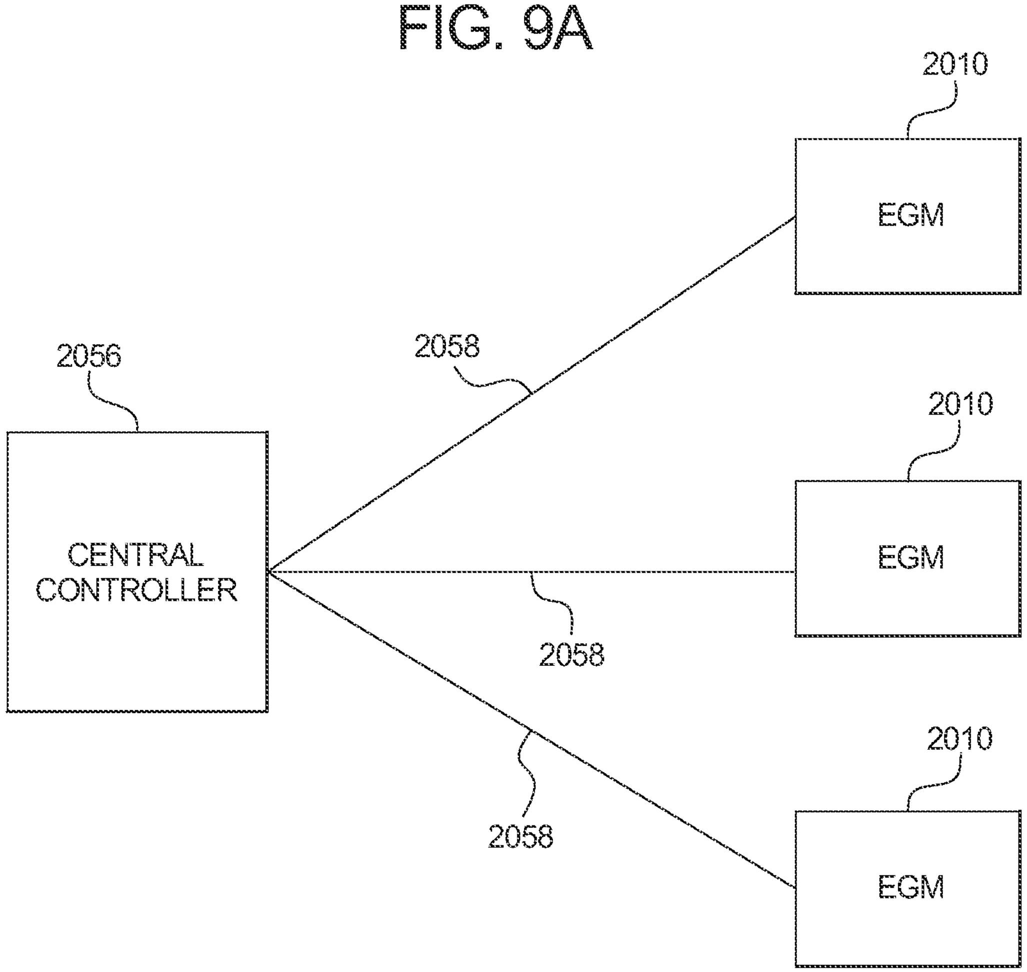
FIG. 9A is a schematic block diagram of one embodiment of a network configuration of the gaming system of the present disclosure.

As noted above, in various embodiments, the gaming system includes an EGM in combination with a central server, central controller, or remote host. In such embodiments, the EGM is configured to communicate with the central server, central controller, or remote host through a data network or remote communication link. In certain such embodiments, the EGM is configured to communicate with another EGM through the same data network or remote communication link or through a different data network or remote communication link. For example, the gaming system illustrated in FIG. 9A includes a plurality of EGMs 2010 that are each configured to communicate with a central server, central controller, or remote host 2056 through a data network 2058.

In certain embodiments in which the gaming system includes an EGM in combination with a central server, central controller, or remote host, the central server, central controller, or remote host is any suitable computing device (such as a server) that includes at least one processor and at least one memory device or storage device. As further described below, the EGM includes at least one EGM processor configured to transmit and receive data or signals representing events, messages, commands, or any other suitable information between the EGM and the central server, central controller, or remote host. The at least one processor of that EGM is configured to execute the events, messages, or commands represented by such data or signals in conjunction with the operation of the EGM. Moreover, the at least one processor of the central server, central controller, or remote host is configured to transmit and receive data or signals representing events, messages, commands, or any other suitable information between the central server, central controller, or remote host and the EGM. The at least one processor of the central server, central controller, or remote host is configured to execute the events, messages, or commands represented by such data or signals in conjunction with the operation of the central server, central controller, or remote host. It should be appreciated that one, more, or each of the functions of the central server, central controller, or remote host may be performed by the at least one processor of the EGM. It should be further appreciated that one, more, or each of the functions of the at least one processor of the EGM may be performed by the at least one processor of the central server, central controller, or remote host.

In certain such embodiments, computerized instructions for controlling any games (such as any primary or base games and/or any secondary or bonus games) displayed by the EGM are executed by the central server, central controller, or remote host. In such "thin client" embodiments, the central server, central controller, or remote host remotely controls any games (or other suitable interfaces) displayed by the EGM, and the EGM is utilized to display such games (or suitable interfaces) and to receive one or more inputs or commands. In other such embodiments, computerized instructions for controlling any games displayed by the EGM are communicated from the central server, central controller, or remote host to the EGM and are stored in at least one memory device of the EGM. In such "thick client" embodiments, the at least one processor of the EGM executes the computerized instructions to control any games (or other suitable interfaces) displayed by the EGM.

In various embodiments in which the gaming system includes a plurality of EGMs, one or more of the EGMs are thin client EGMs and one or more of the EGMs are thick client EGMs. In other embodiments in which the gaming system includes one or more EGMs, certain functions of one or more of the EGMs are implemented in a thin client environment, and certain other functions of one or more of the EGMs are implemented in a thick client environment. In one such embodiment in which the gaming system includes an EGM and a central server, central controller, or remote host, computerized instructions for controlling any primary or base games displayed by the EGM are communicated from the central server, central controller, or remote host to the EGM in a thick client configuration, and computerized instructions for controlling any secondary or bonus games or other functions displayed by the EGM are executed by the central server, central controller, or remote host in a thin client configuration.

In certain embodiments in which the gaming system includes: (a) an EGM configured to communicate with a central server, central controller, or remote host through a data network; and/or (b) a plurality of EGMs configured to communicate with one another through a data network, the data network is a local area network (LAN) in which the EGMs are located substantially proximate to one another and/or the central server, central controller, or remote host. In one example, the EGMs and the central server, central controller, or remote host are located in a gaming establishment or a portion of a gaming establishment.

In other embodiments in which the gaming system includes: (a) an EGM configured to communicate with a central server, central controller, or remote host through a data network; and/or (b) a plurality of EGMs configured to communicate with one another through a data network, the data network is a wide area network (WAN) in which one or more of the EGMs are not necessarily located substantially proximate to another one of the EGMs and/or the central server, central controller, or remote host. For example, one or more of the EGMs are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs are located, it should be appreciated that in certain embodiments in which the data network is a WAN, the gaming system includes a central server, central controller, or remote host and an EGM each located in a different gaming establishment in a same geographic area, such as a same city or a same state, it should be appreciated that gaming systems in which the data network is a WAN are substantially identical to gaming systems in which the data network is a LAN, though the quantity of EGMs in such gaming systems may vary relative to one another.

In further embodiments in which the gaming system includes: (a) an EGM configured to communicate with a central server, central controller, or remote host through a data network; and/or (b) a plurality of EGMs configured to communicate with one another through a data network, the data network is an internet or an intranet. In certain such embodiments, an internet browser of the EGM is usable to access an internet game page from any location where an internet connection is available. In one such embodiment, after the internet game page is accessed, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. It should be appreciated, however, that the central server, central controller, or remote host may identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM, such as by identifying the MAC address or the IP address of the internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the internet browser of the EGM.

It should be appreciated that the central server, central server, or remote host and the EGM are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile internet network), or any other suitable medium, it should be appreciated that the expansion in the quantity of computing devices and the quantity and speed of internet connections in recent years increases opportunities for players to use a variety of EGMs to play games from an ever-increasing quantity of remote sites. It should also be appreciated that the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 9B:
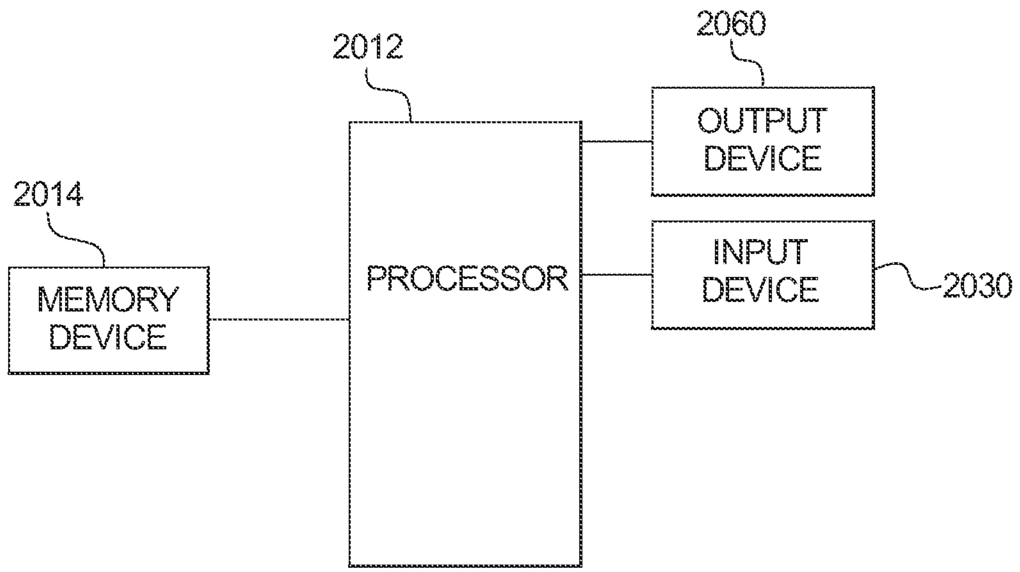
FIG. 9B is a schematic block diagram of an example electronic configuration of the gaming system of the present disclosure.

In various embodiments, an EGM includes at least one processor configured to operate with at least one memory device, at least one input device, and at least one output device. The at least one processor may be any suitable processing device or set of processing devices, such as a microprocessor, a microcontroller-based platform, a suitable integrated circuit, or one or more application-specific integrated circuits (ASICs). FIG. 9B illustrates an example EGM including a processor 2012.

As generally noted above, the at least one processor of the EGM is configured to communicate with, configured to access, and configured to exchange signals with at least one memory device or data storage device, in various embodiments, the at least one memory device of the EGM includes random access memory (RAM), which can include non-volatile RAM (NVRAM), magnetic RAM (MRAM), ferroelectric RAM (FeRAM), and other forms as commonly understood in the gaming industry. In other embodiments, the at least one memory device includes read only memory (ROM). In certain embodiments, the at least one memory device of the EGM includes flash memory and/or EEPROM (electrically erasable programmable read only memory). The example EGM illustrated in FIG. 9B includes a memory device 2014. It should be appreciated that any other suitable magnetic, optical, and/or semiconductor memory may operate in conjunction with the EGM disclosed herein, in certain embodiments, the at least one processor of the EGM and the at least one memory device of the EGM both reside within a cabinet of the EGM (as described below), in other embodiments, at least one of the at least one processor of the EGM and the at least one memory device of the EGM reside outside the cabinet of the EGM (as described below).

In certain embodiments, as generally described above, the at least one memory device of the EGM stores program code and instructions executable by the at least one processor of the EGM to control the EGM. The at least one memory device of the EGM also stores other operating data, such as image data, event data, input data, random number generators (RNGs) or pseudo-RNGs, paytable data or information, and/or applicable game rules that relate to the play of one or more games on the EGM (such as primary or base games and/or secondary or bonus games as described below). In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium, in certain such embodiments, an operator (such as a gaming establishment operator) and/or a player uses such a removable memory device in an EGM to implement at least part of the present disclosure, in other embodiments, part or all of the program code and/or the operating data is downloaded to the at least one memory device of the EGM through any suitable data network described above (such as an internet or intranet).

Figure 10A:
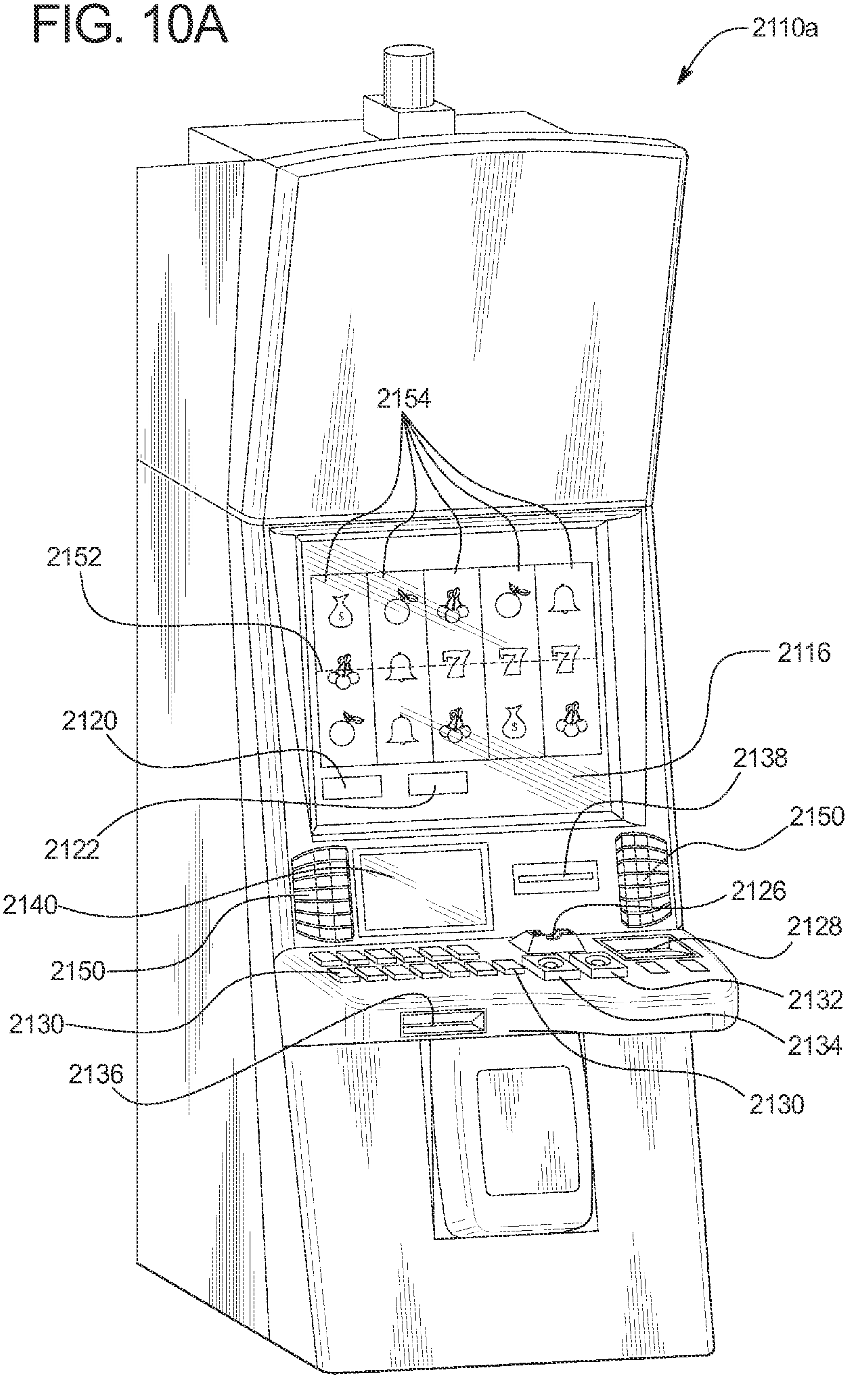
FIGS. 10A and 10B are perspective views of example alternative embodiments of the gaming system of the present disclosure.
Figure 10B:
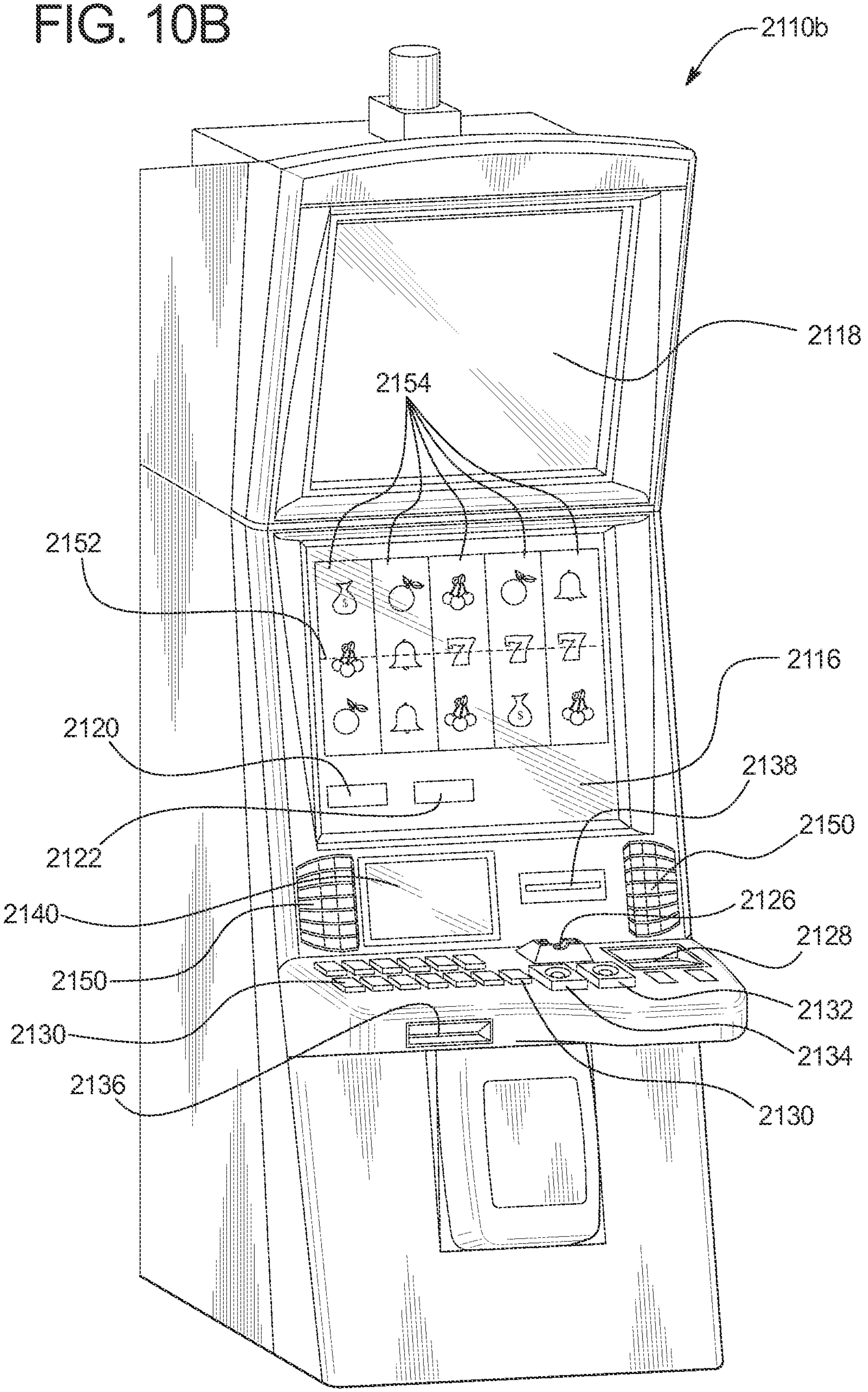

In various embodiments, the EGM includes one or more input devices. The input devices may include any suitable device that enables an input signal to be produced and received by the at least one processor of the EGM. The example EGM illustrated in FIG. 9B includes at least one input device 2030. One input device of the EGM is a payment device configured to communicate with the at least one processor of the EGM to fund the EGM. In certain embodiments, the payment device includes one or more of: (a) a bill acceptor info which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. FIGS. 10A and 10B illustrate example EGMs that each include the following payment devices: (a) a combined bill and ticket acceptor 2128, and (b) a coin slot 2126.

In one embodiment, the EGM includes a payment device configured to enable the EGM to be funded via an electronic funds transfer, such as a transfer of funds from a bank account, in another embodiment, the EGM includes a payment device configured to communicate with a mobile device of a player, such as a cell phone, a radio frequency identification tag, or any other suitable wired or wireless device, to retrieve relevant information associated with that player to fund the EGM. It should be appreciated that when the EGM is funded, the at least one processor determines the amount of funds entered and displays the corresponding amount on a credit display or any other suitable display as described below.

In various embodiments, one or more input devices of the EGM are one or more game play activation devices that are each used to initiate a play of a game on the EGM or a sequence of events associated with the EGM following appropriate funding of the EGM. The example EGMs illustrated in FIGS. 10A and 10B each include a game play activation device in the form of a game play initiation button 2132. It should be appreciated that, in other embodiments, the EGM begins game play automatically upon appropriate funding rather than upon utilization of the game play activation device.

In certain embodiments, one or more input devices of the EGM are one or more wagering or betting devices. One such wagering or betting device is as a maximum wagering or betting device that, when utilized, causes a maximum wager to be placed. Another such wagering or betting device is a repeat the bet device that, when utilized, causes the previously-placed wager to be placed. A further such wagering or betting device is a bet one device. A bet is placed upon utilization of the bet one device. The bet is increased by one credit each time the bet one device is utilized. Upon the utilization of the bet one device, a quantity of credits shown in a credit display (as described below) decreases by one, and a number of credits shown in a bet display (as described below) increases by one.

In other embodiments, one input device of the EGM is a cash out device. The cash out device is utilized to receive a cash payment or any other suitable form of payment corresponding to a quantity of remaining credits of a credit display (as described below). The example EGMs illustrated in FIGS. 10A and 10B each include a cash out device in the form of a cash out button 2134.

In certain embodiments, one input device of the EGM is a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In various embodiments, one input device of the EGM is a sensor, such as a camera, in communication with the at least one processor of the EGM (and controlled by the at least one processor of the EGM in some embodiments) and configured to acquire an image or a video of a player using the EGM and/or an image or a video of an area surrounding the EGM.

In embodiments including a player tracking system, as further described below, one input device of the EGM is a card reader in communication with the at least one processor of the EGM. The example EGMs illustrated in FIGS. 10A and 10B each include a card reader 2138. The card reader is configured to read a player identification card inserted into the card reader.

In various embodiments, the EGM includes one or more output devices. The example EGM illustrated in FIG. 9B includes at least one output device 2060. One or more output devices of the EGM are one or more display devices configured to display any game(s) displayed by the EGM and any suitable information associated with such game(s). In certain embodiments, the display devices are connected to or mounted on a cabinet of the EGM (as described below). In various embodiments, the display devices serves as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM illustrated in FIG. 9A includes a central display device 2116, a player tracking display 2140, a credit display 2120, and a bet display 2122. The example EGM illustrated in FIG. 9B includes a central display device 2116, an upper display device 2118, a player tracking display 2140, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. It should be appreciated that the display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, one output device of the EGM is a payout device. In these embodiments, when the cash out device is utilized as described above, the payout device causes a payout to be provided to the player, in one embodiment, the payout device is one or more of: (a) a ticket generator configured to generate and provide a ticket or credit slip representing a payout, wherein the ticket or credit slip may be redeemed via a cashier, a kiosk, or other suitable redemption system; (b) a note generator configured to provide paper currency; (c) a coin generator configured to provide coins or tokens in a coin payout tray; and (d) any suitable combination thereof. The example EGMs illustrated in FIGS. 10A and 10B each include ticket generator 2136. In one embodiment, the EGM includes a payout device configured to fund an electronically recordable identification card or smart card or a bank account via an electronic funds transfer.

In certain embodiments, one output device of the EGM is a sound generating device controlled by one or more sound cards. In one such embodiment, the sound generating device includes one or more speakers or other sound generating hardware and/or software for generating sounds, such as by playing music for any games or by playing music for other modes of the EGM, such as an attract mode. The example EGMs illustrated in FIGS. 10A and 10B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. At least U.S. Patent Application Publication No. 2004/0254014 describes a variety of EGMs including one or more communication ports that enable the EGMs to communicate and operate with one or more external peripherals.

As generally described above, in certain embodiments, such as the example EGMs illustrated in FIGS. 10A and 10B, the EGM has a support structure, housing, or cabinet that provides support for a plurality of the input device and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs shown in FIGS. 10A and 10B, EGMs may have varying cabinet and display configurations.

It should be appreciated that, in certain embodiments, the EGM is a device that has obtained approval from a regulatory gaming commission, and in other embodiments, the EGM is a device that has not obtained approval from a regulatory gaming commission.

As explained above, for brevity and clarity, both the EGMs and the personal gaming devices of the present disclosure are collectively referred to herein as "EGMs." Accordingly, it should be appreciated that certain of the example EGMs described above include certain elements that may not be included in all EGMs. For example, the payment device of a personal gaming device such as a mobile telephone may not include a coin acceptor, while in certain instances the payment device of an EGM located in a gaming establishment may include a coin acceptor.

Operation of Primary or Base Games and/or Secondary or Bonus Games

In various embodiments, an EGM may be implemented in one of a variety of different configurations. In various embodiments, the EGM may be implemented as one of: (a) a dedicated EGM wherein computerized game programs executable by the EGM for controlling any primary or base games (referred to herein as "primary games") and/or any secondary or bonus games or other functions (referred to herein as "secondary games") displayed by the EGM are provided with the EGM prior to delivery to a gaming establishment or prior to being provided to a player; and (b) a changeable EGM wherein computerized game programs executable by the EGM for controlling any primary games and/or secondary games displayed by the EGM are downloadable to the EGM through a data network or remote communication link after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards, in certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. At least U.S. Pat. Nos. 7,470,183; 7,563,163; and 7,833,092 and U.S. Patent Application Publication Nos. 2005/0148382, 2006/0094509, and 2009/0181743 describe various examples of this type of award determination.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card, if the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. At least U.S. Pat. Nos. 7,753,774; 7,731,581; 7,955,170; and 8,070,579 and U.S. Patent Application Publication No. 2011/0028201 describe various examples of this type of award determination.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host, in this embodiment, the accounting and gaming information system includes: (a) a player database for storing player profiles, (b) a player tracking module for tracking players (as described below), and (c) a credit system for providing automated transactions. At least U.S. Pat. No. 6,913,534 and U.S. Patent Application Publication No. 2006/0281541 describe various examples of such accounting systems.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGMs shown in FIGS. 10A and 10B each include a payline 1152 and a plurality of reels 2154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof, in other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. At least U.S. Pat. No. 8,012,011 and U.S. Patent Application Publication Nos.

2008/0108408 and 2008/0132320 describe various examples of ways to win award determinations.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. At least U.S. Pat. Nos. 5,766,079; 7,585,223; 7,651,392; 7,666,093; 7,780,523; and 7,905,778 and U.S. Patent Application Publication Nos. 2008/0020846, 2009/0123364, 2009/0123363, and 2010/0227677 describe various examples of different progressive gaming systems.

As generally noted above, in addition to providing winning credits or other awards for one or more plays of the primary game(s), in various embodiments the gaming system provides credits or other awards for one or more plays of one or more secondary games. The secondary game typically enables a prize or payout in to be obtained addition to any prize or payout obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). It should be appreciated that the secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game, in other embodiments, the triggering event or qualifying condition occurs based on a certain amount of game play (such as number of games, number of credits, amount of time) being exceeded, or based on a specified number of points being earned during game play, it should be appreciated that any suitable triggering event or qualifying condition or any suitable combination of a plurality of different triggering events or qualifying conditions may be employed.

In other embodiments, at least one processor of the gaming system randomly determines when to provide one or more plays of one or more secondary games, in one such embodiment, no apparent reason is provided for the providing of the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game, in one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game, in other embodiments, qualification for the secondary game is accomplished through a simple "buy-in." For example, qualification through other specified activities is unsuccessful, payment of a fee or placement of an additional wager "buys-in" to the secondary game, in certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. At least U.S. Patent Application Publication Nos. 2007/0123341, 2008/0070680, 2008/0176650, and 2009/0124363 describe various examples of different group gaming systems.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a cell phone, a radio frequency identification tag, or any other suitable wireless device, to track when a gaming session begins and ends, in another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display, in various embodiments, such tracked information and/or any suitable feature associated with the player tracking system is displayed via one or more service windows that are displayed on the central display device and/or the upper display device. At least U.S. Pat. Nos. 6,722,985; 6,908,387; 7,311,605; 7,611,411; 7,617,151; and 8,057,298 describe various examples of player tracking systems.

It should be understood that various changes and modifications to the present embodiments described herein will be apparent to those skilled in the art. Such changes and modifications can be made without departing from the spirit and scope of the present subject matter and without diminishing its intended advantages, it is therefore intended that such changes and modifications be covered by the appended claims.

The invention is claimed as follows:

1. A gaming system comprising:

at least one processor;

at least one display device;

at least one input device; and at least one memory device storing a plurality of instructions which, when executed by the at least one processor, cause the at least one processor to operate with the at least one display device and the at least one input device to:

(a) display a play of a game associated with:

(i) a plurality of reels including a plurality of symbols, the symbols including a plurality of individual symbols and one or more multi-component symbols, each of the multi-component symbols including a plurality of instances of one or more of the individual symbols; and (ii) a plurality of symbol display areas, each of the reels being associated with a plurality of the symbol display areas; and (b) for said play of the game:

(i) for each of the reels, display a plurality of the symbols on said reel at the symbol display areas associated with said reel;

(ii) for each individual symbol displayed at one or more of the symbol display areas associated with a first one of the reels, if the reel adjacent to the first reel displays at least one instance of said individual symbol at one of the symbol display areas associated with said reel:

(A) determine a quantity of adjacent reels that each displays at least one instance of said individual symbol at one of the symbol display areas associated with said reels, the adjacent reels including the first reel;

(B) determine a base count based on:

(1) a total quantity of instances of said individual symbol included in any multi-component symbols including a plurality of instances of said individual symbol displayed at the symbol display areas associated with said adjacent reels; and (2) a quantity of said adjacent reels that do not display any multi-component symbols including a plurality of instances of said individual symbol at the symbol display areas associated with said reels; and (C) if the determined base count is at least a designated base count:

(1) for each of said adjacent reels, determine a modifier for said reel based on a quantity of the symbol display areas associated with said reel at which at least one instance of said individual symbol is displayed; and (2) determine any awards for said individual symbol based on said determined base count and any determined modifiers; and (iii) provide any determined awards.

2. The gaming system of claim 1, wherein each of one or more of the multi-component symbols includes a plurality of instances of one of the individual symbols.

3. The gaming system of claim 1, wherein each of one or more of the multi-component symbols includes at least one instance of each of a plurality of the individual symbols.

4. The gaming system of claim 1, wherein the plurality of instructions, when executed by the at least one processor, cause the at least one processor to determine the base count by summing: (a) the total quantity of instances of said individual symbol included in any multi-component symbols including a plurality of instances of said individual symbol displayed at the symbol display areas associated with said adjacent reels, and (b) the quantity of said adjacent reels that do not display any multi-component symbols including a plurality of instances of said individual symbol at the symbol display areas associated with said reels.

5. The gaming system of claim 1, wherein the plurality of instructions, when executed by the at least one processor, cause the at least one processor to, if the determined base count is not at least the designated base count, not determine and provide an award for said individual symbol.

6. The gaming system of claim 1, wherein the modifier is a multiplier.

7. The gaming system of claim 6, wherein the multiplier has a multiplier value equal to the quantity of the symbol display areas associated with said reel at which at least one instance of said individual symbol is displayed.

8. The gaming system of claim 7, wherein the plurality of instructions, when executed by the at least one processor, cause the at least one processor to determine a base award for said individual symbol based on said individual symbol and said determined base count.

9. The gaming system of claim 8, wherein the plurality of instructions, when executed by the at least one processor, cause the at least one processor to determine a total award to be provided by multiplying said determined base award by said determined multiplier.

10. The gaming system of claim 1, wherein the plurality of instructions, when executed by the at least one processor, cause the at least one processor to, if the reel adjacent to the first reel does not display at least one instance of said individual symbol at one of the symbol display areas associated with said reel:

(a) if the first reel displays at least one of the multi-component symbols including a plurality of instances of said individual symbol at one of the symbol display areas associated with the first reel, determine a base count based on a total quantity of instances of said individual symbol included in any multi-component symbols including a plurality of instances of said individual symbol displayed at the symbol display areas associated with the first reel;

(b) if the first reel does not display any multi-component symbols including a plurality of instances of said individual symbol at one of the symbol display areas associated with the first reel, determine a base count equal to a default base count; and (c) if the determined base count is at least a designated base count:

(i) determine a modifier for the first reel based on a quantity of the symbol display areas associated with the first reel at which at least one instance of said individual symbol is displayed; and (ii) determine any awards for said individual symbol based on said determined base count and any determined modifier.

11. The gaming system of claim 10, wherein the default base count is equal to one.

12. A method of operating a gaming system, said method comprising:

(a) causing at least one processor to execute a plurality of instructions stored in at least one memory device to operate with at least one display device to display a play of a game associated with:

(i) a plurality of reels including a plurality of symbols, the symbols including a plurality of individual symbols and one or more multi-component symbols, each of the multi-component symbols including a plurality of instances of one or more of the individual symbols; and (ii) a plurality of symbol display areas, each of the reels being associated with a plurality of the symbol display areas; and (b) for said play of the game:

(i) for each of the reels, causing the at least one processor to execute the plurality of instructions to operate with the at least one display device to display a plurality of the symbols on said reel at the symbol display areas associated with said reel;

(ii) for each individual symbol displayed at one or more of the symbol display areas associated with a first one of the reels, if the reel adjacent to the first reel displays at least one instance of said individual symbol at one of the symbol display areas associated with said reel, causing the at least one processor to execute the plurality of instructions to:

(A) determine a quantity of adjacent reels that each displays at least one instance of said individual symbol at one of the symbol display areas associated with said reels, the adjacent reels including the first reel;

(B) determine a base count based on:

(1) a total quantity of instances of said individual symbol included in any multi-component symbols including a plurality of instances of said individual symbol displayed at the symbol display areas associated with said adjacent reels; and (2) a quantity of said adjacent reels that do not display any multi-component symbols including a plurality of instances of said individual symbol at the symbol display areas associated with said reels; and (C) if the determined base count is at least a designated base count:

(1) for each of said adjacent reels, determine a modifier for said reel based on a quantity of the symbol display areas associated with said reel at which at least one instance of said individual symbol is displayed; and (2) determine any awards for said individual symbol based on said determined base count and any determined modifiers; and (iii) providing any determined awards.

13. The method of claim 12, wherein each of one or more of the multi-component symbols includes a plurality of instances of one of the individual symbols.

14. The method of claim 12, wherein each of one or more of the multi-component symbols includes at least one instance of each of a plurality of the individual symbols.

15. The method of claim 12, which includes causing the at least one processor to execute the plurality of instructions to determine the base count by summing: (a) the total quantity of instances of said individual symbol included in any multi-component symbols including a plurality of instances of said individual symbol displayed at the symbol display areas associated with said adjacent reels, and (b) the quantity of said adjacent reels that do not display any multi-component symbols including a plurality of instances of said individual symbol at the symbol display areas associated with said reels.

16. The method of claim 12, which includes causing the at least one processor to execute the plurality of instructions to, if the determined base count is not at least the designated base count, not determine and provide an award for said individual symbol.

17. The method of claim 12, wherein the modifier is a multiplier.

18. The method of claim 17, wherein the multiplier has a multiplier value equal to the quantity of the symbol display areas associated with said reel at which at least one instance of said individual symbol is displayed.

19. The method of claim 18, which includes causing the at least one processor to execute the plurality of instructions to determine a base award for said individual symbol based on said individual symbol and said determined base count.

20. The method of claim 19, which includes causing the at least one processor to execute the plurality of instructions to determine a total award to be provided by multiplying said determined base award by said determined multiplier.

21. The method of claim 12, which includes causing the at least one processor to execute the plurality of instructions to, if the reel adjacent to the first reel does not display at least one instance of said individual symbol at one of the symbol display areas associated with said reel:

(a) if the first reel displays at least one of the multi-component symbols including a plurality of instances of said individual symbol at one of the symbol display areas associated with the first reel, determine a base count based on a total quantity of instances of said individual symbol included in any multi-component symbols including a plurality of instances of said individual symbol displayed at the symbol display areas associated with the first reel;

(b) if the first reel does not display any multi-component symbols including a plurality of instances of said individual symbol at one of the symbol display areas associated with the first reel, determine a base count equal to a default base count; and (c) if the determined base count is at least a designated base count:

(i) determine a modifier for the first reel based on a quantity of the symbol display areas associated with the first reel at which at least one instance of said individual symbol is displayed; and (ii) determine any awards for said individual symbol based on said determined base count and any determined modifier.

22. The method of claim 21, wherein the default base count is equal to one.

23. The method of claim 12, which is provided through a data network.

24. The method of claim 23, wherein the data network is an internet.

25. A non-transitory computer readable medium storing a plurality of instructions which, when executed by at least one processor, cause the at least one processor to:

(a) cause at least one display device to display a play of a game associated with:

(i) a plurality of reels including a plurality of symbols, the symbols including a plurality of individual symbols and one or more multi-component symbols, each of the multi-component symbols including a plurality of instances of one or more of the individual symbols; and (ii) a plurality of symbol display areas, each of the reels being associated with a plurality of the symbol display areas; and (b) for said play of the game:

(i) for each of the reels, cause the at least one display device to display a plurality of the symbols on said reel at the symbol display areas associated with said reel;

(ii) for each individual symbol displayed at one or more of the symbol display areas associated with a first one of the reels, if the reel adjacent to the first reel displays at least one instance of said individual symbol at one of the symbol display areas associated with said reel:

(A) determine a quantity of adjacent reels that each displays at least one instance of said individual symbol at one of the symbol display areas associated with said reels, the adjacent reels including the first reel;

(B) determine a base count based on:

(1) a total quantity of instances of said individual symbol included in any multi-component symbols including a plurality of instances of said individual symbol displayed at the symbol display areas associated with said adjacent reels; and (2) a quantity of said adjacent reels that do not display any multi-component symbols including a plurality of instances of said individual symbol at the symbol display areas associated with said reels; and (C) if the determined base count is at least a designated base count:

(1) for each of said adjacent reels, determine a modifier for said reel based on a quantity of the symbol display areas associated with said reel at which at least one instance of said individual symbol is displayed; and (2) determine any awards for said individual symbol based on said determined base count and any determined modifiers; and (iii) provide any determined awards.

26. The non-transitory computer readable medium of claim 25, wherein each of one or more of the multi-component symbols includes a plurality of instances of one of the individual symbols.

27. The non-transitory computer readable medium of claim 25, wherein each of one or more of the multi-component symbols includes at least one instance of each of a plurality of the individual symbols.

28. The non-transitory computer readable medium of claim 25, wherein the plurality of instructions, when executed by the at least one processor, cause the at least one processor to determine the base count by summing: (a) the total quantity of instances of said individual symbol included in any multi-component symbols including a plurality of instances of said individual symbol displayed at the symbol display areas associated with said adjacent reels, and (b) the quantity of said adjacent reels that do not display any multi-component symbols including a plurality of instances of said individual symbol at the symbol display areas associated with said reels.

29. The non-transitory computer readable medium of claim 25, wherein the plurality of instructions, when executed by the at least one processor, cause the at least one processor to, if the determined base count is not at least the designated base count, not determine and provide an award for said individual symbol.

30. The non-transitory computer readable medium of claim 25, wherein the modifier is a multiplier.

31. The non-transitory computer readable medium of claim 30, wherein the multiplier has a multiplier value equal to the quantity of the symbol display areas associated with said reel at which at least one instance of said individual symbol is displayed.

32. The non-transitory computer readable medium of claim 31, wherein the plurality of instructions, when executed by the at least one processor, cause the at least one processor to determine a base award for said individual symbol based on said individual symbol and said determined base count.

33. The non-transitory computer readable medium of claim 32, wherein the plurality of instructions, when executed by the at least one processor, cause the at least one processor to determine a total award to be provided by multiplying said determined base award by said determined multiplier.

34. The non-transitory computer readable medium of claim 25, wherein the plurality of instructions, when executed by the at least one processor, cause the at least one processor to, if the reel adjacent to the first reel does not display at least one instance of said individual symbol at one of the symbol display areas associated with said reel:

(a) if the first reel displays at least one of the multi-component symbols including a plurality of instances of said individual symbol at one of the symbol display areas associated with the first reel, determine a base count based on a total quantity of instances of said individual symbol included in any multi-component symbols including a plurality of instances of said individual symbol displayed at the symbol display areas associated with the first reel;

(b) if the first reel does not display any multi-component symbols including a plurality of instances of said individual symbol at one of the symbol display areas associated with the first reel, determine a base count equal to a default base count; and (c) if the determined base count is at least a designated base count:

(i) determine a modifier for the first reel based on a quantity of the symbol display areas associated with the first reel at which at least one instance of said individual symbol is displayed; and (ii) determine any awards for said individual symbol based on said determined base count and any determined modifier.

35. The non-transitory computer readable medium of claim 34, wherein the default base count is equal to one.

* * * * *